US011010666B1

(12) United States Patent
Terilla et al.

(10) Patent No.: US 11,010,666 B1
(45) Date of Patent: May 18, 2021

(54) SYSTEMS AND METHODS FOR GENERATION AND USE OF TENSOR NETWORKS

(71) Applicant: Tunnel Technologies Inc., New York, NY (US)

(72) Inventors: John Terilla, New York, NY (US); Ioannis Vlassopoulos, Montrouge (FR)

(73) Assignee: TUNNEL TECHNOLOGIES INC., New York, NY (US)

( * ) Notice: Subject to any disclaimer, the term of this patent is extended or adjusted under 35 U.S.C. 154(b) by 132 days.

(21) Appl. No.: 16/169,373

(22) Filed: Oct. 24, 2018

Related U.S. Application Data

(60) Provisional application No. 62/576,456, filed on Oct. 24, 2017.

(51) Int. Cl.
*G06N 3/08* (2006.01)
*G06N 3/04* (2006.01)
*G06N 3/02* (2006.01)
*G06F 40/40* (2020.01)

(52) U.S. Cl.
CPC .............. *G06N 3/08* (2013.01); *G06F 40/40* (2020.01); *G06N 3/02* (2013.01); *G06N 3/04* (2013.01)

(58) Field of Classification Search
CPC . G06F 2207/4824; G10L 13/00; G10L 15/00; G10L 15/16; G10L 15/18; G10L 15/183; G10L 17/16; G10L 17/18; G10L 25/27; G10L 25/30; G06N 3/00; G06N 3/02; G06N 3/04; G06N 3/0454; G06N 3/08; G06N 7/046; G06N 20/00
See application file for complete search history.

(56) References Cited

U.S. PATENT DOCUMENTS

| | | | |
|---|---|---|---|
| 2013/0212052 A1* | 8/2013 | Yu | G06N 3/04 706/25 |
| 2015/0301510 A1* | 10/2015 | Dull | G05B 13/027 706/23 |
| 2017/0038750 A1* | 2/2017 | Dull | G05B 13/027 |
| 2017/0178346 A1* | 6/2017 | Ferro | G06K 9/6274 |

(Continued)

OTHER PUBLICATIONS

Cincio et al, "Multiscale Entanglement Renormalization Ansatz in Two Dimensions: Quantum Ising Model", Jun. 19, 2008, Physical Review Letters, PRL 100, 240603 (2008), pp. 1-4 (Year: 2008).*

*Primary Examiner* — Linda Wong
(74) *Attorney, Agent, or Firm* — Schwegman Lundberg & Woessner, P.A.

(57) ABSTRACT

Systems, methods, media, and other such embodiments described herein relate to computational analysis of data associated using tensor networks. One embodiment involves accessing a set of input data (e.g. text, images, audio, or other data associated with language or "meaning" correlations) from a memory of a computing device, and processing the input data to generate a plurality of data elements as a sequence of vectors representing the input data. This sequence of vectors is then input into a tensor network comprising a plurality of interconnected nodes, with each node comprising an operator having an associated operator value, with the operator being configured to act on a product of a vector space associated with a data element of the plurality of data elements. The tensor network outputs one or more values, with each value associated with at least one data element of set of input data.

14 Claims, 9 Drawing Sheets

(56) References Cited

U.S. PATENT DOCUMENTS

| | | | | |
|---|---|---|---|---|
| 2017/0316307 | A1* | 11/2017 | Koster | G06F 7/00 |
| 2017/0337481 | A1* | 11/2017 | Trouillon | G06N 7/00 |
| 2018/0018556 | A1* | 1/2018 | Young | G06N 3/02 |
| 2018/0025257 | A1* | 1/2018 | van den Oord | G06K 9/4652 |
| | | | | 375/240.14 |
| 2018/0165288 | A1* | 6/2018 | Chang | G06N 3/0445 |
| 2018/0165577 | A1* | 6/2018 | Young | G06N 3/08 |
| 2018/0204117 | A1* | 7/2018 | Brevdo | G06N 3/084 |
| 2018/0336241 | A1* | 11/2018 | Noh | G06N 20/00 |
| 2018/0349477 | A1* | 12/2018 | Jaech | G06F 16/9535 |
| 2019/0392802 | A1* | 12/2019 | Higurashi | G10L 25/27 |
| 2020/0104718 | A1* | 4/2020 | Taba | G06N 3/084 |
| 2020/0111006 | A1* | 4/2020 | Brenner | G06N 3/0454 |
| 2020/0151580 | A1* | 5/2020 | Horesh | G06N 3/0481 |

* cited by examiner

SYSTEMS AND METHODS FOR GENERATION AND USE OF TENSOR NETWORKS

PRIORITY CLAIM

This application claims the benefit of priority to U.S. Provisional Patent Application Ser. No. 62/576,456 filed on Oct. 24, 2017 entitled "SYSTEMS AND METHODS FOR GENERATION AND USE OF TENSOR NETWORKS" which is incorporated herein by reference for all purposes.

TECHNICAL FIELD

Embodiments described herein relate to machine-based analysis of data, and more particularly, to the use of tensor networks implemented in computing devices to generate values which identify correlations within sets of "meaning" data (e.g. text, language data, image data, audio data, etc.), and the use of such values within tensor networks to generate new sets of data.

BACKGROUND

Improvements in computing devices have enabled greater and greater use of complex models to analyze large datasets. Statistical language modeling, for example, aims to capture joint probability distributions of sequences of words. Early statistical language models include next-word prediction and vector embeddings of words based on colocation with reasonable performance on word similarity exams. Efforts to build on early successes encounter difficulties arising from the high-dimensionality of the data, given that language is not random. One approach to address "the curse of high-dimensionality" is to truncate sequences under consideration to finite length phrases, or n-grams, and employ a hidden Markov model. Since hidden Markov models essentially cutoff correlations between words beyond a fixed distance, the success of this approach depends on the application. For example, 3-gram and 4-gram models have been employed effectively for speech recognition and translation, applications in which very long-distance correlations are of limited importance. Additionally, long-sort term memory (LSTM) recurrent neural networks have been employed to produce statistical language model applications.

BRIEF DESCRIPTION OF THE DRAWINGS

Various appended drawings merely illustrate example embodiments of the present disclosure and should not be considered as limiting its scope.

DETAILED DESCRIPTION

Figure 1:
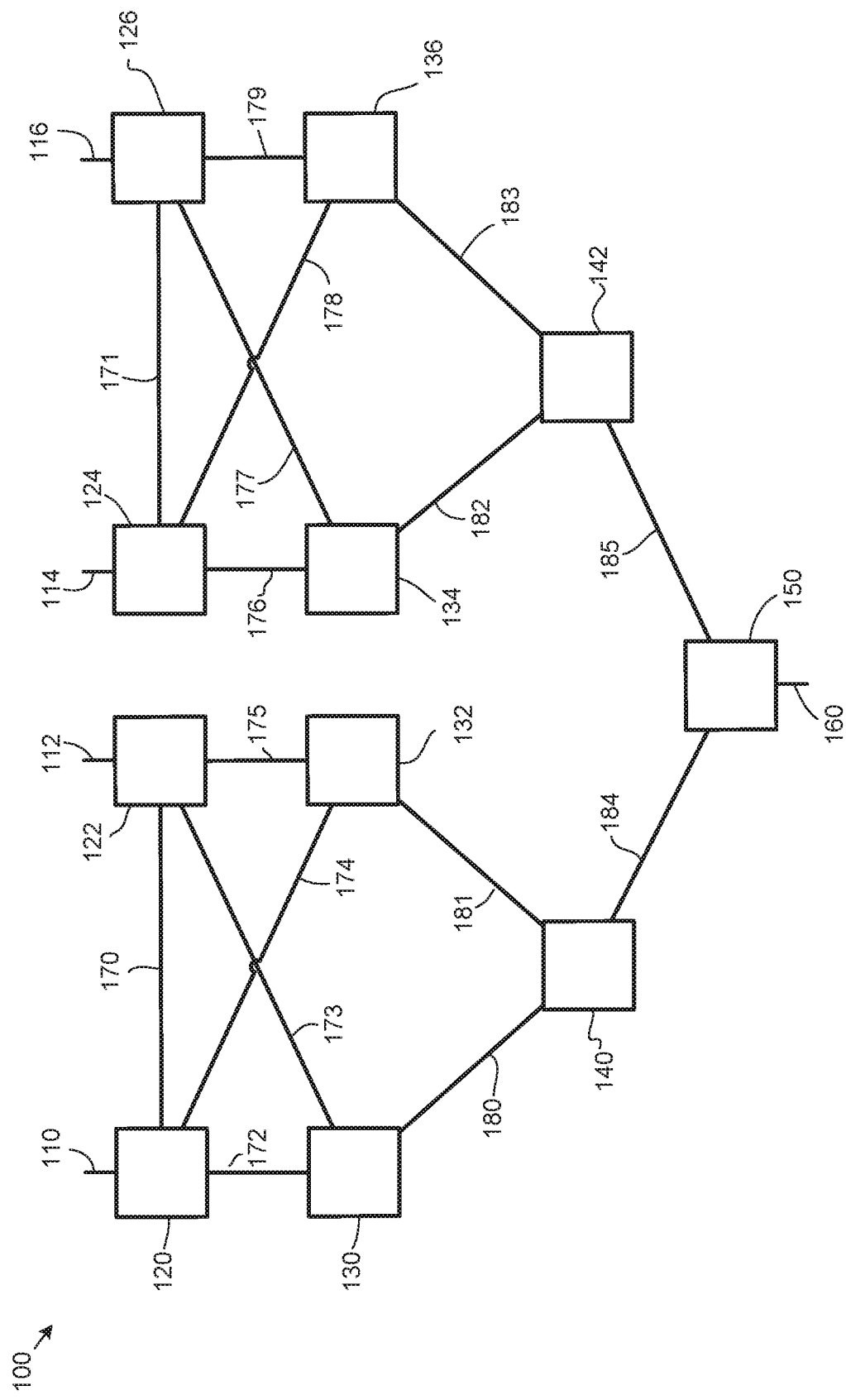
FIG. 1 represents an example tensor network in accordance with some embodiments.

The description that follows includes details of systems, devices, methods, and computer readable storage media related to generation and use of tensor networks. In the following description, for the purposes of explanation, numerous specific details are set forth in order to provide an understanding of various embodiments. It will be evident, however, that additional embodiments that are not specifically described are also possible in accordance with the present innovations.

As described herein, a tensor network refers to a computer-based modeling system. The basic construction of a tensor network accepts input data to a computing system that includes the tensor network, and then uses computational techniques train the tensor network. The tensor network is made of connected nodes having associated data (e.g. tensors). As described herein, a tensor is an object which is analogous to but more general than a vector or matrix, represented by components that are functions of the coordinates of a space. A tensor may be considered a generalized matrix which may have any number of dimensions. A matrix is a two-dimensional tensor, and a vector is a one-dimensional tensor. In addition to including numeric data, tensors may also include information related to transformations between tensors (e.g. transformations resulting in a tensor product). Following design and training of a tensor network, the tensor network operating on a computing device may then be used to accept input data, and based on the training, output values that capture aspects of probability distributions within the input data.

As detailed above, Markov, hidden-Markov, and LSTM neural networks have been employed for statistical language modeling, but these systems have limitations which are improved on by embodiments described herein. For example, n-gram models belie the essential critical behavior inherent in language. Human languages, like many biological systems including families of proteins, genomes, neurons in the brain, and the notes in a musical symphony, have significant long-range correlations that decay with a power law. In contrast, any Markov or hidden-Markov system, such as an n-gram model, has long range correlations that decay exponentially. Similarly, LSTM recurrent neural networks are not useful for matching the two point functions of training data or higher order statistics of data sets, even though they are useful for translating short phrases or certain basic analysis. By contrast, the tensor network systems described herein are configured to provide an improved alternative to the above models by addressing the high-dimensionality and distant correlations within larger sets of data.

Tensor networks as described herein can be distinguished from neural networks. While the charts and some descriptions commonly used to describe tensor networks and neural networks have similarities, there is no direct overlap between the functionality of neural networks and tensor networks. In neural networks, the nodes are nonlinear activation functions. The edges of the nodes accept input numbers that are weighted (e.g. multiplied by an edge weight) and the result is input into a nonlinear function node, which outputs a value. Many of these nonlinear function nodes are connected together to form a neural network. The network can be trained using input data with a known or expected output to adjust the weights on the nodes within the network. A particular function is specified within the neural network by labelling each edge with a real number.

FIG. 1 represents an example tensor network 100 in accordance with some embodiments. While at a basic level, FIG. 1 describes connected nodes similar to the general concept of a connected node within a neural network, the connected nodes of a tensor network reflect very different functionality. In FIG. 1, the entire unlabeled picture represents a set of vectors in a complex Hilbert space of quantum states. The nodes (e.g. tensors) of FIG. 1 represent possibly distinct operators acting on tensor products of different vector spaces. The edges (e.g. connections between nodes) in FIG. 1 represent connections that describe partial compositions of operators. A particular vector is specified by specifying fixed operators for each node. The various tensors are structured in a particular topology (e.g. graph) to generate a tensor network that can be trained using input data with predetermined outputs.

In particular, FIG. 1 includes nodes 120, 122, 124, 126, 130, 132, 134, 136, 140, 142, and 150. The nodes are connected to each as shown by connections 170-185. An initial layer of input nodes (e.g. nodes 120, 122, 124, and 126) accept input data elements via inputs 110, 112, 114, and 116. The data to be analyzed in processed into a format acceptable at the inputs, such as a sequence of vectors. Any type of data may be translated into such a format. For embodiments described herein, this particularly includes language data in a text or audio format, and image or audio data that has characteristics associated with language (e.g. images or sounds that will be associated with particular words or language phrases, such as beach, waterfall, airplane, car, etc.) Such data may be referred to herein as "meaning" data in order to distinguish from more abstract or scientific model data.

When a data element is input to a node (e.g. nodes 120, 122, 124, or 126) via a corresponding input (e.g. 110, 112, 114, and 116, respectively), an operator for the node is configured to act on the data element to generate a tensor product. This tensor product is then passed along via at least one output to additional nodes to be used as an input for that node. The next node then similarly acts on the received tensor product of vector spaces (associated with an original element of the input data elements and transformed by previous nodes) to generate an output vector.

Each of the nodes in intermediate layers (e.g. nodes 130, 132, 134, 136, 140, and 142) has at least one input for accepting the product of the vectors from one or more previous nodes, and at least one output for outputting an output vector generated by the operator of the node. In other embodiments, an output may be any tensor, any number, or any other such output. The data elements input to the tensor network are then processed through the nodes to one or more outputs of the tensor network 100. In FIG. 1, a single output 160 from node 150 is shown. Just as with previous nodes, node 150 accepts products of vectors from previous nodes (e.g. nodes 140 and 142 via connections 184 and 185) and operates on those received vector spaces (e.g. received via inputs to node 150 associated with connections 184 and 185). The vector generated by the operator of node 150 is then output via output 160. While tensor network 100 of FIG. 1 is shown as having a single output, in other embodiments, a tensor network may have any number of outputs, and the data provided at the outputs may be used in a variety of different ways for analyzing language, image, and audio data or complex correlations between among various and different types of data, as described below.

Such tensor networks allow for simplified modeling of large vector spaces (e.g. input data elements which may be vector spaces on the order of $2^{23}$ and larger.) Instead of modeling the entire space, the tensor network allows for assumptions about the large space to generate a simplified space that retains important descriptive properties associated with the large vector space. Classically, tensor networks have been used to model particles in quantum physics, with each particle in a system associated with a vector in the vector space. Embodiments described herein relate to expanding the use of tensor networks beyond models of physical particles in the context of Physics, and expanding tensor networks to analysis of other vector spaces (e.g. language data, image data, audio data, or other meaning data). Examples of vector spaces that can be modeled in a simplified form with tensor networks in accordance with embodiments described herein include vector spaces representing language (e.g. all words in the English language, all words in a particular Spanish dictionary, etc.) and the relationships between words in the language. For modeling of a particular language vector space, a particular graph is selected for the tensor network, and the tensor network can be trained with examples of language (e.g. books, audio of speech usage, etc.) to essentially collapse the Hilbert space to a simplified representation within the selected graph. The resulting trained tensor network may then accept an example of language use, and output a probability representing whether the input language is an acceptable representation of the language. It will be apparent that other applications beyond language may be modeled in accordance with the embodiments described herein. Associated tensor networks similar to the models described herein for language may be implemented for other applications in accordance with the innovations described herein.

The use of tensor networks in the analysis data in such contexts provides benefits not previously known. In particular, tensor networks may be used to generate simplified models of a complex Hilbert space in a field such as language, while maintaining information associated with long-range correlations. An example within language of such long distance correlations may be considered with a vector for the word "king" minus a vector for the word "queen" giving a result that is roughly equivalent to the vector for the word "man" minus the vector for the word "woman." A similar relationship, for example, would be a vector for "England" minus a vector for "London" being roughly equivalent to a vector for "France" minus a vector for "Paris". An additional more complex example of such a long-range correlation, for example, may be correlations between the words on a first page and the words on a last page of the book "War and Peace". Such information may be maintained in a tensor network describing the entire book or the Russian language, while drastically simplifying the vector space from the entire Hilbert space of the words in the book or the words in the language. Tensor networks enable analysis and modeling of such complex vector spaces while maintaining relationships which may be considered in the context of relational concepts such as critical systems, anti-de Sitter/conformal field theory (ADS-CFT) correspondence, holographic principles allowing the description of a volume of space on a lower dimensional region boundary, and other such concepts for capturing long-range correlations within a simplified space.

Certain embodiments may involve a translation-invariant statistical language model referred to herein as a trace-density model. While such trace-density models aren't critical, they may be expanded toward critical models of data involving languages or meaning values associated with such data (e.g. text, descriptions of images or audio, etc.). Such models involve matrix-product-states which can approximate power-law decays over long distances. In addition, some embodiments involve constraints related to a moment map of a Hamiltonian action which have explicitly computable gradients that reduce the space model parameters to a topologically compact moduli space making it possible to build a training algorithm based on maximizing and minimizing aspects of the system.

A corpus (e.g. body or collection) of text such as:

$$C = a_{i_1} a_{i_2} \ldots a_{i_M} \quad (1)$$

is a finite sequence of words from a vocabulary. Such a vocabulary may be made up of any symbols representing the atomic elements from which the text is constructed as a sequence (e.g. various alphabets, numbers, symbols, etc.). With $X(C)$ denoting all phrases of the body of text $C$, where a phrase is a finite subsequence of adjacent elements, $X(C)$ has more structure than a random set. Such a body of text is graded, with each phrase having a defined length given by the number of words comprising that phrase and the set of phrases is the disjoint union of the sets of phrases with the same word length given as:

$$X(C) = \bigcup_{k=1}^{M} X^k(C) \quad (2)$$

where $X^k(C) :=$ {phrases in the corpus $C$ consisting of $k$ words.} (3)

$X(C)$ has a partially defined product $X(C) \times X(C) \rightarrow X(C)$ defined by concatenation of phrases. By adding a formal zero phrase to each graded component of $X(C)$, the product can be extended to all of $X(C)$ by defining the product of two phrases to be zero if the concatenation is not a phrase contained in the corpus. The product is compatible with the grading:

$$X^k(C) \times X^l(C) \rightarrow X^{k+l}(C) \quad (4)$$

Viewed with the structure, the set of phrases $X(C)$ is a graded monoid which is a quotient of the free monoid generated the vocabulary $A(C) = X^1(C)$. For each phrase length k, there is a probability distribution of the set $X^k(C)$, which is the number of times a phrase appears in C divided by the total number of phrases of length k. If the text is sufficiently large, this probability distribution an approximation to an idealized probability distribution on all phrases in the language, of which the corpus is an observed sample. Embodiments described herein model the collections of these idealized probability distributions As mentioned above, a density on a Hilbert space is a semipositive operator with unit trace. Here, a finite dimension d is fixed so operations work with $\mathbb{C}^d$ with its standard inner product so that operators are identified with matrices.

A d×d density matrix P defines a nonnegative real valued function on the set $\mathrm{Mat}_{d \times d}(\mathbb{C})$ of d×d complex matrices by:

$$A \mapsto \mathrm{tr}(APA^*). \quad (5)$$

The superscript * denotes conjugate transpose and tr denotes a trace function. The (i; i) element of $APA^*$ is the nonnegative real number $\langle v; Pv \rangle$ where:

$$v \in \mathbb{C}^d \quad (6)$$

is the i-th column of the matrix A, and $\mathrm{tr}(APA^*)$ is the sum of these numbers as v ranges over the columns of A. A d-dimensional trace density representation of a corpus C consists of the following data: (1) A d×d density P, and (2) a function:

$$D: A(C) \rightarrow \mathrm{Mat}_{d \times d}(\mathbb{C}) \quad (7)$$

where D is called the dictionary. The dictionary D assigns a d×d complex matrix $M_i$ to each word $w_i$ in the vocabulary and extends to a function:

$$X(C) \rightarrow M_{d \times d}(\mathbb{C}) \quad (8)$$

on all phrases by mapping a phrase to the product of matrices assigned to the words that comprise the phrase. That is, the phrase $x = a_{i_1} \ldots a_{i_k} \in X^k(C)$ is mapped to the matrix $M = M_{i_1} \ldots M_{i_k}$. The trace density of the trace density representation is the nonnegative, real valued function $q: X(C) \rightarrow \mathbb{R}$ defined as the composition:

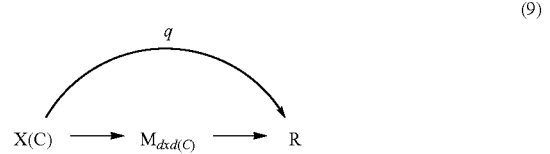

(9)

and $$a_{i_1} \ldots a_{i_k} \mapsto M_{i_1} \ldots M_{i_k} \mapsto \mathrm{tr}((M_{i_1} \ldots M_{i_k}) P (M_{i_1} \ldots M_{i_k})^*) \quad (10)$$

A trace density representation for a corpus of text C will be considered a trace density model for that corpus if the trace density of a phrase approximates the probability of the phrase x appearing. A trace density model for a corpus C captures the joint probability distribution of sequences of words efficiently since all of the information is contained in the dictionary D that translates individual words to d×d matrices. The model requires no additional memory to store the matrices assigned to elements of data (e.g. phrases, sentences, paragraphs, portions of an image, portions of audio, or sections of various different types of data as the model is applied to "meaning" data of various types). Only a relatively efficient computation is used, which is a matrix product that is polynomial in the dimension of the representation and linear in the number of words. Such a trace density model is translation invariant, and a probability of the phrase x appearing is independent of the position within the model.

For a corpus C with vocabulary $A(C) = \{a_1, \ldots, a_n\}$ with V denoting the complex n-dimensional vector space generated by the vocabulary, and $W = \mathbb{C}^d$, The dictionary $\{a_i \mapsto M_i\}$ of a d-dimensional trace-density representation can be assembled into a single map $M: V \rightarrow \mathrm{hom}(W \otimes W)$ by extending the $a_i$ to $M_i$ assignment linearly. The single map M is described by $nd^2$ numbers ($\{M_{iab}\}$ and defines a tensor of order (n;d;d). The particular complex number $M_{iab}$ and the entire tensor M can be denoted graphically using a tensor network diagram as shown in FIG. 1, with each node associated with a tensor or a probability density. The connections between nodes may be considered as denoting contraction of indices.

Embodiments of such representations may have density constraints and identity constraints. These constraints give trance-density properties needed for joint-probability distributions on phrases in language, or in other associations of meaning in data described herein. Moreover, these constraints define a compact moduli space of representations by quadratic and cubic equations that serves as a setting in which one may fit a trace-density model to training data by a maximum entropy algorithm. These constraints also fit into a physical interpretation of models described herein.

For a d-dimensional trace-density representation of C with density P and dictionary D that maps $a_i \to M_i$, the trace-density representation satisfies the density constraint $$\sum_{i=1}^{n} M_i P M_i^* = P \qquad (11)$$

The trace-density of a phrase x is a nonnegative real number with no further a priori restrictions. The density constraint of equation 11, however, implies that the trace-density of a representation gives rise to probability distributions on the set of length k phrases $X^k(C)$, such that, if q is the trace density of a representation satisfying the density constraint of equation 11, then for every k=1, 2, . . . .

$$\sum_{x \in X^k(C)} q(x) = 1 \qquad (12)$$

and $$\sum_{p \in P^1(C)} q(p) = \sum_{i=1}^{n} q(w_i) = \sum_{i=1}^{n} tr(M_i P M_i^*) = tr\left(\sum_{i=1}^{n} M_i P M_i^*\right) = tr(P) = 1 \qquad (13)$$

A trace density representation satisfies the identity constraint provided that:

$$\sum_{i=1}^{n} M_i^* M_i = I \qquad (14)$$

where I is the d×d identity matrix.

Now, the density constraint (1) together with the identity constraint (2) imply that the probability distributions defined by the trace-density fit together the way joint probabilities for sequences of words do, that is, the probability distributions for phrases of different length are related as conditional probability distributions. Such distributions may also occur in other types of data, referred to as "meaning" data herein, describing relationships between various types of data such as text, images, audio, and other such data which may be analyzed as described herein.

With q as the trace density of a representation satisfying the density and identity constraints above, and x is any phrase, then for every k,l=1, 2 . . . .

$$q(x) = \sum_{x' \in X^k(C), x'' \in X^l(C)} q(x'xx'') \qquad (15)$$

This allows tensor networks describing the bodies of text to be reduced as described herein. As part of such operations, the density and identity constraints are cubic and quadratic in the entries of matrices P, $M_1$, . . . , $M_n$, yet these two constraints imply higher order constraints which may be used for joint distribution determined by the trace density to fit together for a statistical language model.

With V as the n-dimensional complex vector space generated by vocabulary, the space V becomes a Hilbert space with an inner product defined by declaring that the vocabulary $\{a_1, \ldots, a_n\}$ defines an orthonormal, independent spanning set. A state of the system is defined to be a density $Q: V \to V$. For a system in the state Q, the probability that word $a_i$ is observed is given by $tr(QO_i)$, where $O_i: W \to W$ is the "observable" defined by orthogonal projection onto the subspace spanned by ai. If the density Q is the projection on a unit vector $\psi$, then the state Q is said to be pure and:

$$tr(QO_i) = \langle \psi, O_i \psi \rangle \qquad (16)$$

In coordinates, if:

$$\psi = \Sigma_i c_i a_i \qquad (17)$$

then $$tr(QO_i) = |c_i|^2. \qquad (18)$$

The state space for a system consisting of k elements is $V^{\otimes k}$, which is a Hilbert space with orthonormal basis consisting of the $n^k$ vectors:

$$a_{i_1, i_2, \ldots, i_k} := a_{i_1} \otimes a_{i_2} \otimes \ldots \otimes a_{i_k} \qquad (19)$$

A state of such a many element system is a density:

$$Q: V^{\otimes k} \to V^{\otimes k} \qquad (20)$$

and the probability that a system in the state Q is observed in the state $ai_1 \ldots i_k$ is $tr(QO)$ where O is the projection on $ai_1 \ldots i_k$. A state Q induces a state on $V^{\otimes j} \to V^{\otimes j}$ for j<k by partial trace. Language or meaning data as described herein may then be described statistically by a pure state Q in a tensor product of a very large number of copies of V, with Q as a projection onto $\psi$ with:

$$\psi \in V \otimes \ldots \otimes V \otimes V \otimes V \otimes \ldots \otimes V' \qquad (21)$$

A pure state $\psi$ in a tensor product of copies of V is sometimes well approximated by an MPS. This means that there are auxiliary spaces W1, . . . , Wk and vectors $\phi_1 \in V \otimes W_1^*$, $\phi_2 \in W_1 \otimes V \otimes W_2^*$, $\phi_3 \in W_2 \otimes V \otimes W_3^*$, . . . , $\phi_{k-1} \in W_{k-1} \otimes V \otimes W_k^*$, $\phi_k \in W_k \otimes V$ with $\psi$ obtained from $\phi_1 \otimes \phi_2 \otimes \ldots \otimes \phi_k$ by contracting all adjacent $W_i^* \otimes W_i$ pairs in the expression:

$$\phi_1 \otimes \phi_2 \otimes \phi_k \in (V \otimes W_1^*) \otimes (W_1 \otimes V \otimes W_2^*) \otimes \ldots \otimes (W_k \otimes V) \qquad (22)$$

The decomposition of $\psi$ as an MPS is not unique. Even for fixed auxiliary spaces, W1, . . . , Wk, there is a large gauge group acting the MPS decomposition. For example, automorphisms of each Wi act nontrivially on the MPS decomposition, while fixing the state $\psi$ obtained after contraction.

A trace-density model for language attempts to approximate the pure state $\psi$ by a translation invariant MPS. Ignoring the boundaries, a translation invariant MPS involves a single auxiliary space W of dimension d (called the bond dimension) and a single vector $$M \in W \otimes V \otimes W^* \qquad (23)$$

so that if $\psi$ is obtained from $M \otimes \ldots \otimes M$ by contracting $W^* \otimes W$ in adjacent pairs. Using a hom-tensor adjunction, the space $W \otimes V \otimes W^*$ is isomorphic to $\hom(V, \hom(W,W))$, which is the data in the dictionary.

At the boundaries, with $|\psi\rangle$ as a state in an infinite number of copies of V, for any k, by partial trace $|\psi\rangle$ inducing a state on $V^{\otimes k}$ can be reduced to an identity with a single density. With other gauge choices, the density and identity constraints can be fashioned as a pair of symmetric equations. The density P is self-adjoint, and so has a self-adjoint square root, a matric Q satisfying $Q^*Q=Q^2=P$. With $N_i=M_iQ$ then $$P = \sum_{i=1}^{n} M_i P M_i^* = \sum_{i=1}^{n} M_i Q Q^* M_i^* = \sum_{i=1}^{n} N_i N_i^* \quad (24)$$

and $$I = \sum_{i=1}^{n} M_i^* M_i \Rightarrow P = \sum_{i=1}^{n} Q^* M_i^* M_i Q = \sum_{i=1}^{n} N_i^* N_i \quad (25)$$

which results in $$\sum_{i=1}^{n} [N_i, N_i^*] = 0$$

(26)

Trace-density representations satisfying the density and identity constraints are plentiful and define a non-empty compact moduli space. The simple trace-density representation consisting of:

$$P = I \text{ and } M_1 = M_2 = \ldots = M_n = \frac{1}{\sqrt{n}} I \quad (27)$$

shows that representations satisfying both the density and identity constraints exist. To see that they form a compact moduli space of representations first note that the identity constraint decomposes into $d^2$ equations in $nd^2$ variables, one equation for each entry of:

$$\sum_{i=1}^{n} M_i^* M_i = I \quad (28)$$

with the form $$1 = \sum_{a,b=1}^{n} \overline{c_{iab}} c_{iab} = (x_{iab})^2 + (y_{iab})^2 \quad (29)$$

wherein the (a,b)-entry of Mi is:

$$c_{iab} = x_{iab} + i y_{iab}. \quad (30)$$

Each of these equations defines a space homeomorphic to $S^{2dn-1}$. The condition that P be a density is a compact condition since the set of semi-positive matrices defines a cone in finite-dimensional Euclidean space and those with unit trace define a slice of the cone homeomorphic to a closed ball B. The remaining scalar constraints defined by the off-diagonal entries of the matrix equation 28. and all entries of:

$$\sum_{i=1}^{n} M_i P M_i^* = P \quad (31)$$

which define a closed and compact subset of $S^{2dn-1} \times S^{2dn-1} \ldots \times S^{2dn-1} \times B$. Quotienting by the action of the gauge group yields the moduli space of trace-density representations satisfying the density and identity constraints. Additionally, for finding trace-density representations that satisfy the two constraints, one may begin with a tensor M satisfying only the identity constraint, and then find an appropriate density P that fits with the density constraint.

The density and identity constraints thus make it possible to train a computer to find a trace density model by a maximum entropy algorithm. The idea is to find a trace-density representation that maximizes the (logarithm of the) trace-density for each phrase in the dataset (e.g. text, image, or audio text). The fact that the moduli space of trace-density representations satisfying the density and identity constraints is compact provides a likelihood of the existence of a maximal entropy trace-density model. The constraints provide that, for certain models in certain embodiments, the total trace density over all possible phrases of a fixed length will equal one, and so maximizing the trace-densities of the phrases in the corpus may automatically make the exponential number of nonsense phrases have nearly zero trace-density.

The following then provide simplified examples that may be structured for analysis using a tensor network as described herein. A simple example embodiment may operate with two word sentences. If V is the word vector space, then the 2-sentence space is $V \otimes V$. Samples in such a space may be $v_0 \otimes u$ and $v_1 \otimes u$ for words v0, v1, and u, where v0 and v1 have the same continuation. Some such systems may be described by a pure state where:

$$\psi \in V \quad (32)$$

and $$\psi = \frac{i}{\sqrt{2}} (v_0 \otimes u + v_1 \otimes u) \quad (33)$$

so that the density on $V \otimes V$ is the projection on $\psi$, $Pr_\psi$.

An operation to reduce (e.g. marginalize) with respect to the second word may be performed in order to obtain a subspace of V (e.g. a subspace corresponding to the first word) and to obtain meaning vectors for v0 and v1 in V. In order for the two words to have the same continuation, the meaning vectors are the same. As part of such an embodiment:

$$Pr_\psi = \psi^s \otimes \psi \quad (34)$$

and $$Tr_2 Pr_\psi = \frac{1}{\sqrt{2}} (v_0^* \otimes v_0 + v_0^* \otimes v_1 + v_1^* \otimes v_0 + v_1^* \otimes v_0) \quad (35)$$

where $Tr_2$ is the partial trance with respect to the second word. In the basis v0, v1 the matrix of $Tr_2 Pr_\psi$ is:

$$Tr_2 Pr_\psi = \frac{1}{2}\begin{pmatrix} 1 & 1 \\ 1 & 1 \end{pmatrix} = \begin{pmatrix} 1 & -1 \\ 1 & 1 \end{pmatrix}\begin{pmatrix} 1 & 0 \\ 0 & 0 \end{pmatrix}\begin{pmatrix} \frac{1}{2} & \frac{1}{2} \\ \frac{1}{2} & \frac{1}{2} \end{pmatrix} \quad (36)$$

$Tr_2 Pr_\psi$ has $$\begin{pmatrix} 1 \\ 1 \end{pmatrix}$$

eigenvalue 1 with $$\begin{pmatrix} -1 \\ 1 \end{pmatrix}$$

eigenvector and eigenvalue 0 with eigenvector
With $$w := \begin{pmatrix} 1 \\ 1 \end{pmatrix} \quad (37)$$

the meaning vector map is:

$$f := Pr_w : V \to V \quad (38)$$

Within the coordinates then:

$$v_0 := \begin{pmatrix} 1 \\ 0 \end{pmatrix} \quad (39)$$

and $$v_1 := \begin{pmatrix} 0 \\ 1 \end{pmatrix} \quad (40)$$

with $$f(v_0) = Pr_w(v_0) = \begin{pmatrix} 1 \\ 1 \end{pmatrix} \quad (41)$$

so that $$f(v_0) = Pr_w(v_1) = \begin{pmatrix} 1 \\ 1 \end{pmatrix} \quad (42)$$

so that they are equal. By such a procedure a tensor network may be used to find meaning vectors for single words. Starting with arbitrary word vectors, a system may be used to find vectors which reflect the meaning of words (e.g. by marginalizing over extensions as above). This may be considered as a "zero layer" of a tensor network.

Another example embodiment with a two word sentences is now further described, using V as the word vector space, with the 2-sentence space V⊗V. In the second example, the samples are $v_1 \otimes u_1$, $v_2 \otimes u_1$, $v_3 \otimes u_2$ and $v_4 \otimes u_2$. In this system:

$$\psi = \frac{1}{2}(v_1 \otimes u_1 + v_2 \otimes u_1 + v_3 \otimes u_2 + v_4 \otimes u_2) \quad (43)$$

so that just as above, the density on the two sentence space is the projection on ψ, $Pr_\psi \psi$.

Just as in the example above, the system is reduced (e.g. marginalized) with respect to the second word to obtain a subspace of V (e.g. a subspace corresponding to the first word) and meaning vectors for words v1, v2, v3, and v4 in V are obtained. In this example, the meaning vectors are structured, for the purposes of the example, so that v1 and v2 have the same meaning vector, and so that v3 and v4 have the same meaning vector (e.g. as they have the same continuation).

$Tr_2$ is the partial trance with respect to the second word so that again $$Pr_\psi = \psi^* \otimes \psi \quad (44)$$

and $$Tr_2 Pr_\psi = \quad (45)$$

$$\frac{1}{4}(v_1^* \otimes v_1 + v_1^* \otimes v_2 + v_2^* \otimes v_1 + v_2^* \otimes v_2 + v_3^* \otimes V_3 + V_3^* \otimes v_4 + v_4^* \otimes v_3 + v_4^* \otimes v_4).$$

So in the basis $v_1$; $v_2$; $v_3$; $v_4$:

$$Tr_2 Pr_\psi = \frac{1}{4}\begin{pmatrix} 1 & 1 & 0 & 0 \\ 1 & 1 & 0 & 0 \\ 0 & 0 & 1 & 1 \\ 0 & 0 & 1 & 1 \end{pmatrix} = \quad (46)$$

$$\begin{pmatrix} 1 & 0 & -1 & 0 \\ 1 & 0 & 1 & 0 \\ 0 & 1 & 0 & -1 \\ 0 & 1 & 0 & 1 \end{pmatrix}\begin{pmatrix} \frac{1}{2} & 0 & 0 & 0 \\ 0 & \frac{1}{2} & 0 & 0 \\ 0 & 0 & 0 & 0 \\ 0 & 0 & 0 & 0 \end{pmatrix}\begin{pmatrix} \frac{1}{2} & \frac{1}{2} & 0 & 0 \\ 0 & 0 & \frac{1}{2} & \frac{1}{2} \\ -\frac{1}{2} & \frac{1}{2} & 0 & 0 \\ 0 & 0 & -\frac{1}{2} & \frac{1}{2} \end{pmatrix}$$

$Tr_2 Pr_\psi$ has eigenvalue 0 with eigenvectors:

$$w_1 := \begin{pmatrix} -1 \\ 1 \\ 0 \\ 0 \end{pmatrix} \quad (47)$$

and $$w_2 := \begin{pmatrix} 0 \\ 0 \\ -1 \\ 1 \end{pmatrix} \quad (48)$$

with eigenvalue ½ with eigenvectors:

$$w_3 := \begin{pmatrix} 1 \\ 1 \\ 0 \\ 0 \end{pmatrix} \quad (49)$$

and $$w_4 := \begin{pmatrix} 0 \\ 0 \\ 1 \\ 1 \end{pmatrix} \quad (50)$$

In these coordinates:

$$v_1 := \begin{pmatrix} 1 \\ 0 \\ 0 \\ 0 \end{pmatrix} \tag{51}$$

$$v_2 := \begin{pmatrix} 0 \\ 1 \\ 0 \\ 0 \end{pmatrix} \tag{52}$$

$$v_3 := \begin{pmatrix} 0 \\ 0 \\ 1 \\ 0 \end{pmatrix} \tag{53}$$

and $$v_4 := \begin{pmatrix} 0 \\ 0 \\ 0 \\ 1 \end{pmatrix} \tag{54}$$

Which further enables the computations that:

$$v_1 = \frac{-1}{2} W_1 + \frac{1}{2} W_3 \tag{55}$$

$$v_2 = \frac{1}{2} W_1 + \frac{1}{2} W_3 \tag{56}$$

$$v_3 = \frac{-1}{2} W_2 + \frac{1}{2} W_4 \tag{57}$$

and $$v_4 = \frac{1}{2} W_2 + \frac{1}{2} W_4. \tag{58}$$

Then, with W denoting the subspace of V spanned by w3 and w4, and the meaning vector map of:

$$f := Pr_W : V \to V \tag{59}$$

it may be seen that:

$$f(v_1) = Pr_W(v_1) = \frac{1}{2} W_3 \tag{60}$$

$$f(v_2) = Pr_W(v_2) = \frac{1}{2} W_3 \tag{61}$$

$$f(v_3) = Pr_W(v_3) = \frac{1}{2} W_4 \tag{62}$$

and $$f(v_4) = Pr_W(v_4) = \frac{1}{2} W_4 \tag{63}$$

so that the meaning vectors of $v_1$ and $v_2$ are equal, and so are those of $v_3$ and $v_4$.

As more complex samples which are longer than the number of sites targeted for computation are considered, creating the resulting pure state and then tracing out extra cites gives a mixed (e.g. non-diagonal) density, even though orthogonal vectors are used. This solves a problem of getting diagonal densities as a result of using orthogonal vectors and considering the Gramm matrix. In certain systems, there may be an issue when a network size is reached where there is no space for longer expressions. This may be resolved by stopping (e.g. setting outputs) at an intermediate output, and considering the values of those outputs as a meaning space. Instead of a binary tree which is triangular, this results in a trapezoidal structure, with the final meaning space as a tensor product of some spaces.

Figure 8:
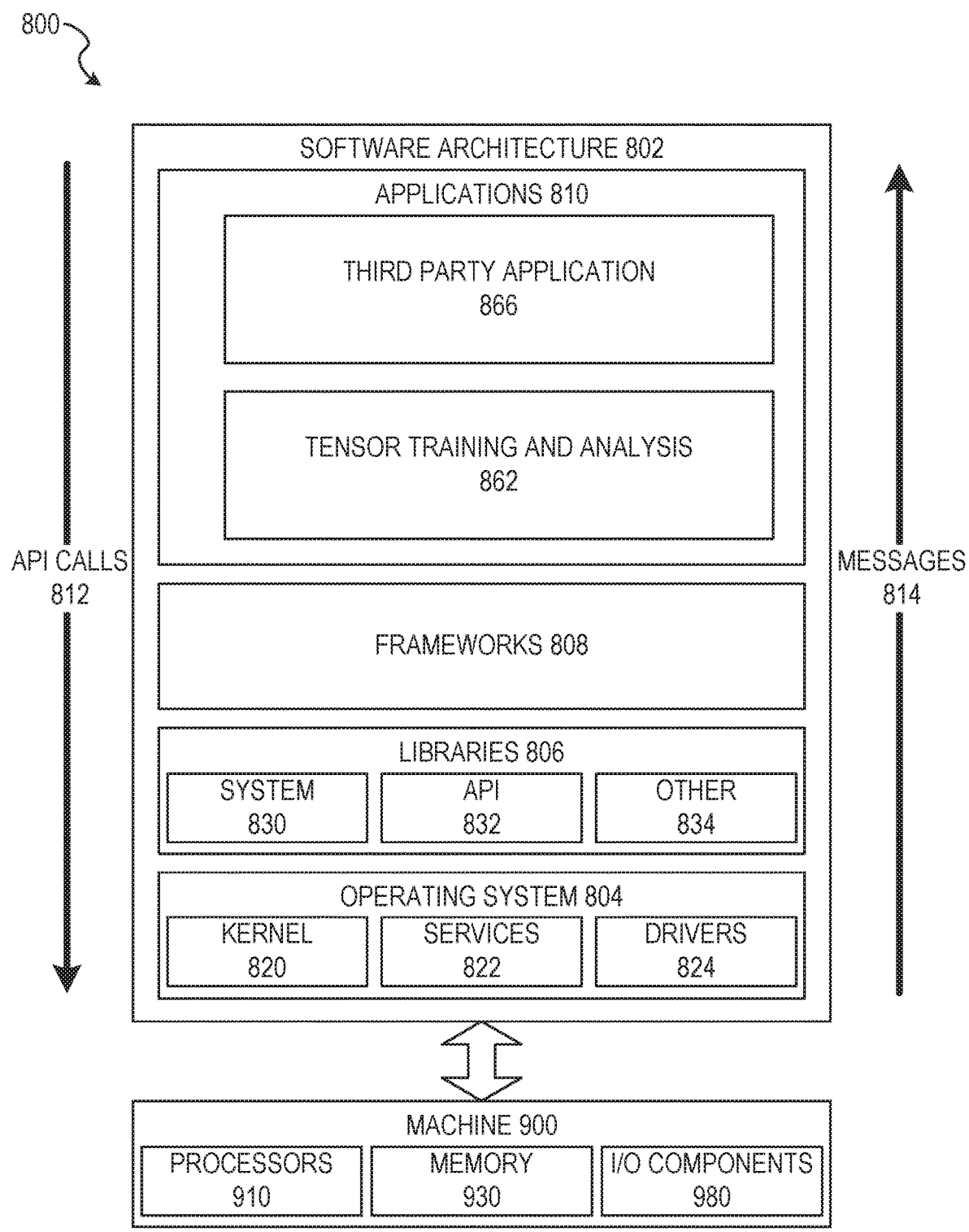
FIG. 8 is a block diagram illustrating an example of a software architecture that may be used to implement a tensor network in accordance with some example embodiments.
Figure 9:
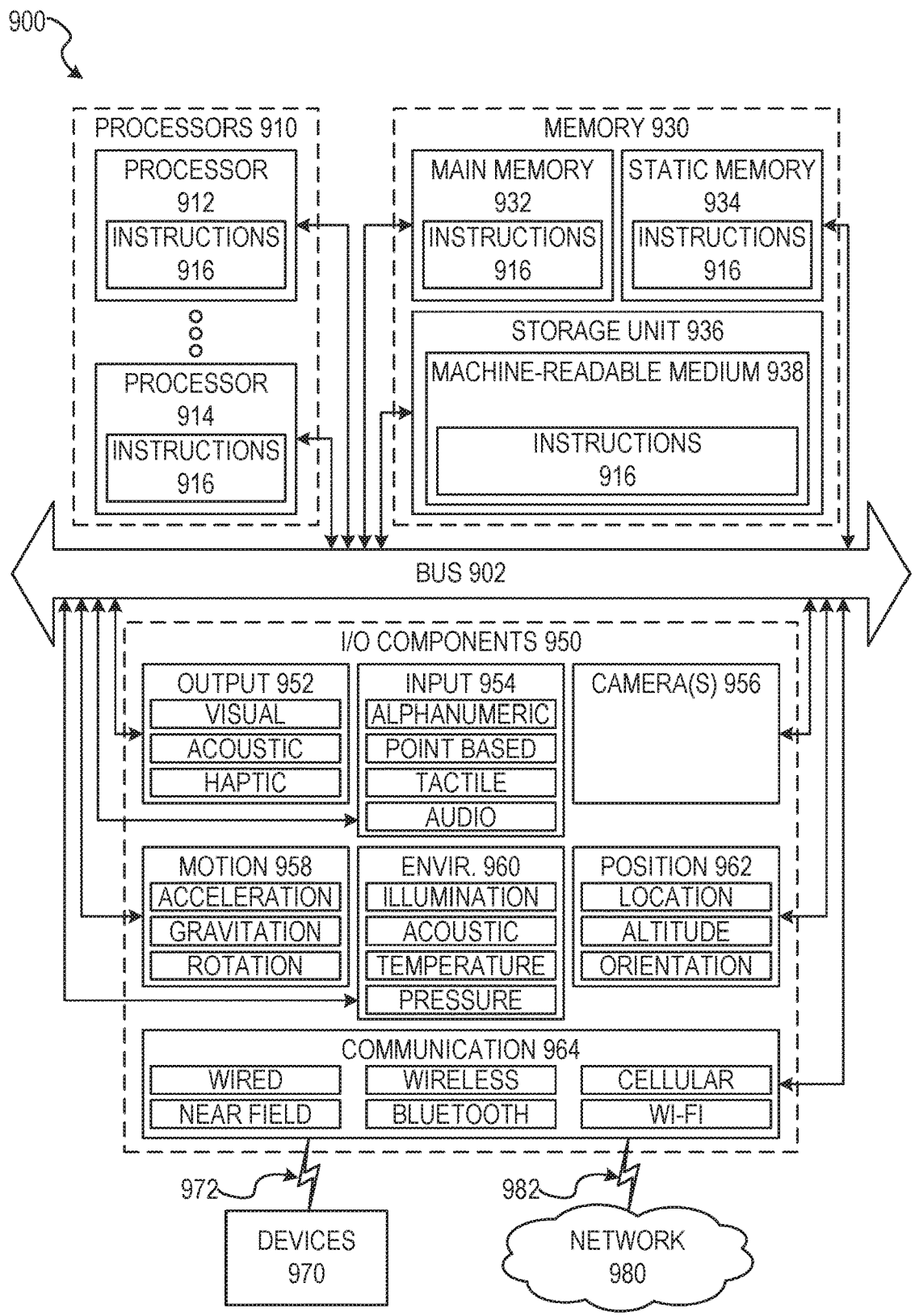
FIG. 9 is a diagrammatic representation of a machine in the form of a computer system within which a set of instructions are executed, causing the machine to perform any one or more of the methodologies discussed herein and to implement tensor networks as described herein, according to some example embodiments.

It will be apparent that such calculations may be expanded to much larger sets of data, with the structures of the tensor network and the associated calculations made when processing data using the tensor network structure executed by processors of a computing device, such as the example device of FIGS. 8 and 9.

As described above, the selection of a structure for a graph used for a particular tensor network is considered in accordance with the embodiments described herein. In a first example of statistical language modeling, the input may be a corpus of text (e.g. translated into vector-based data elements compatible with a tensor network) and the output an output vector. In some embodiments, this output vector may be considered as a quantum density value. For example, in some embodiments, the quantum density assigns to every sentence a probability that it is a meaningful sentence and can be used to predict sentence continuation, fill in the blanks, or sentence pre-history. A doubled matrix product state (MPS) graph for a tensor network may be used, with a the doubled MPS graph structure used for the associated tensor network and trained by density matrix renormalization group (DMRG) operations or other such techniques to find minimum energy states, which may then be used to model language as described above.

Figure 2:
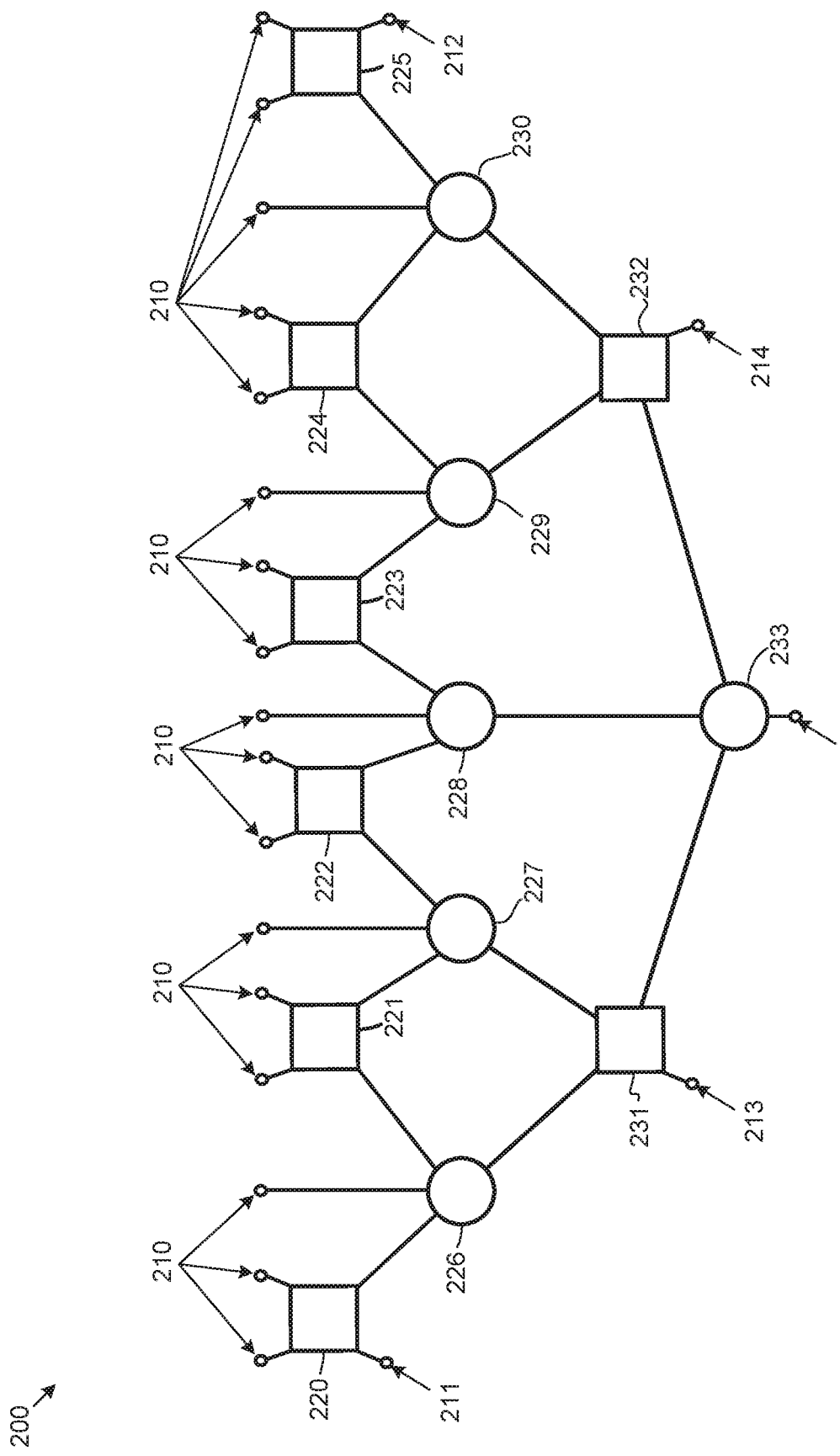
FIG. 2 represents an example tensor network configured in ternary multiscale entanglement renormalization ansatz (MERA) structure in accordance with some embodiments.
Figure 3:
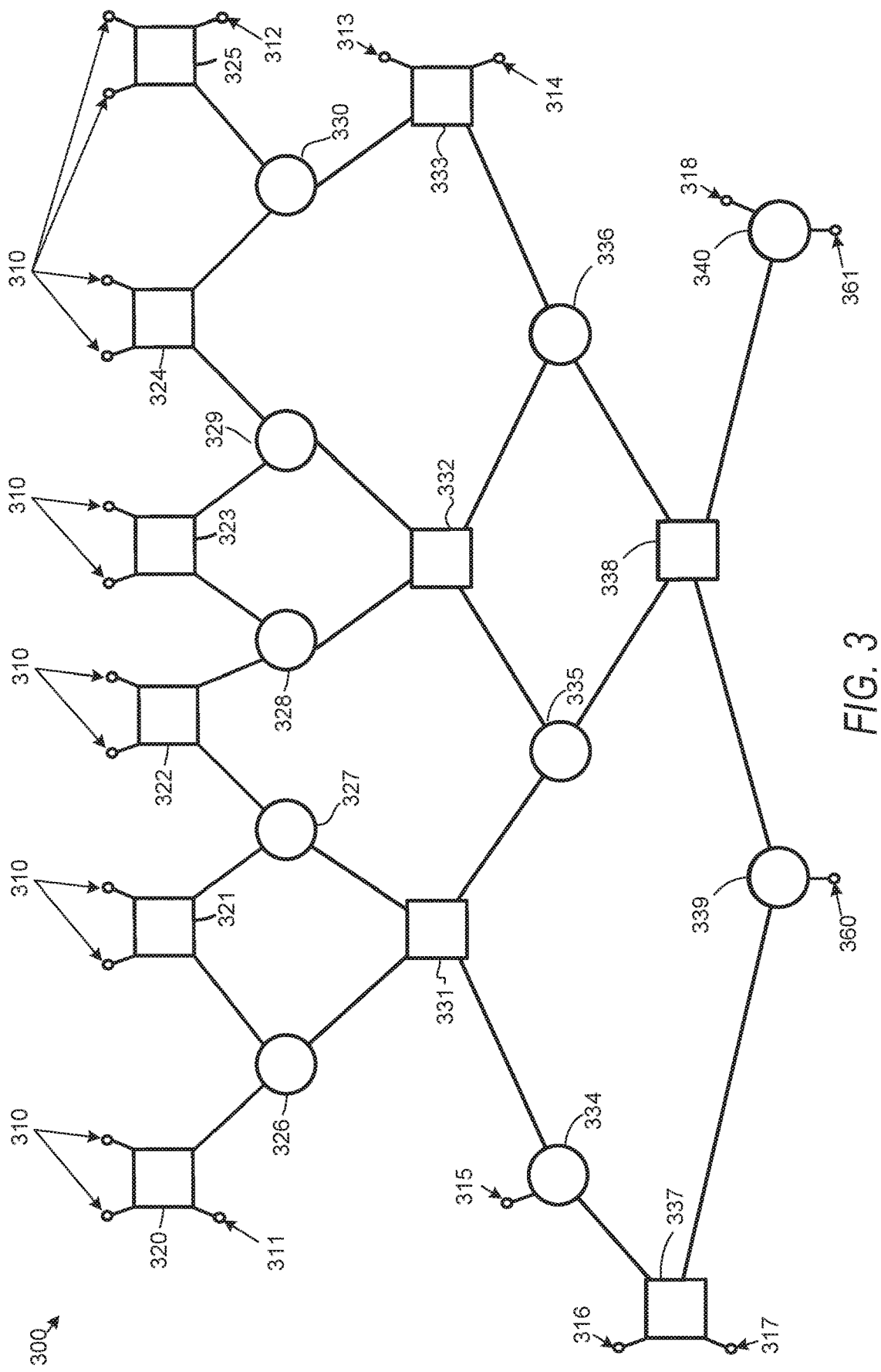
FIG. 3 represents an example tensor network configured in a binary MERA structure in accordance with some embodiments.

FIGS. 2 and 3 illustrate additional graph structures for tensor networks that may be used in accordance with some embodiments. FIG. 2 describes a ternary multiscale entanglement renormalization ansatz (MERA) graph structure for a tensor network 200. The illustrated portion of the tensor network 200 may be a portion of a larger tensor network with a repeated or expanded pattern based on the illustrated nodes and connections. The tensor network 200 as shown includes nodes 220-233, with inputs 210, output 260, and the various illustrated connections between the nodes. Just as with the tensor network of FIG. 1, the inputs 210 may be configured to accept formatted or translated data elements (e.g. vectors) which are generated from text, images, audio, or other such data sources. These inputs are then processed through the nodes 220-233 to create an output value at output 260. An expanded tensor network may have additional nodes, inputs, and outputs connected to tensor network 200 via intermediate outputs 211-214. For example, intermediate output 211 may connect node 220 to another node (not shown) via a connection similar to the connection between nodes 225 and 230. Similarly, intermediate output 213 may connect node 231 to another node (not shown) via a connection similar to the connection between node 232 and node 233.

FIG. 3 describes a binary MERA graph for a tensor network 300. Tensor network 300 includes inputs 310, nodes 320-340, outputs 360 and 361, and intermediate connection edges 311-318. Just as above, the inputs 310 may be configured to accept a plurality of data elements (e.g. a sequence of vectors) which are generated from text, images, audio, or other such data sources. These inputs are then processed through the nodes 320-340 to create output values (e.g. meaning vectors or quantum density values) at outputs 360 and 361. Also just as above, the pattern may be extended to a large number of inputs and outputs. Further still, while the tensor networks 100, 200, and 300 are represented in two dimensions in the figures, with small numbers of connections between the nodes at various levels (e.g. with a "level" based on the smallest number of connections between a node and an input to the network) it will be apparent that the structure of a tensor network may include connections in a large number of dimensions to accommodate data sets with a large dimensional structure. Further, the nodes in such structures may include any number of connections between nodes within a tensor network.

In one example, such graphs may be used with a tensor network structured with an input that may be a body of text and the output a sequence of quantum densities. A probability is assigned to every sentence that it is a meaningful sentence, similar to the first example above. The additional densities of the sequence of quantum densities describe quantum probabilities of combinations of words that assemble as "higher concepts." Such higher concepts may be discovered in an unsupervised way as long-range correlations identified by the tensor network. The probabilities that arbitrary combinations of words are among the discovered higher concepts are captured by these quantum densities.

Figure 4:
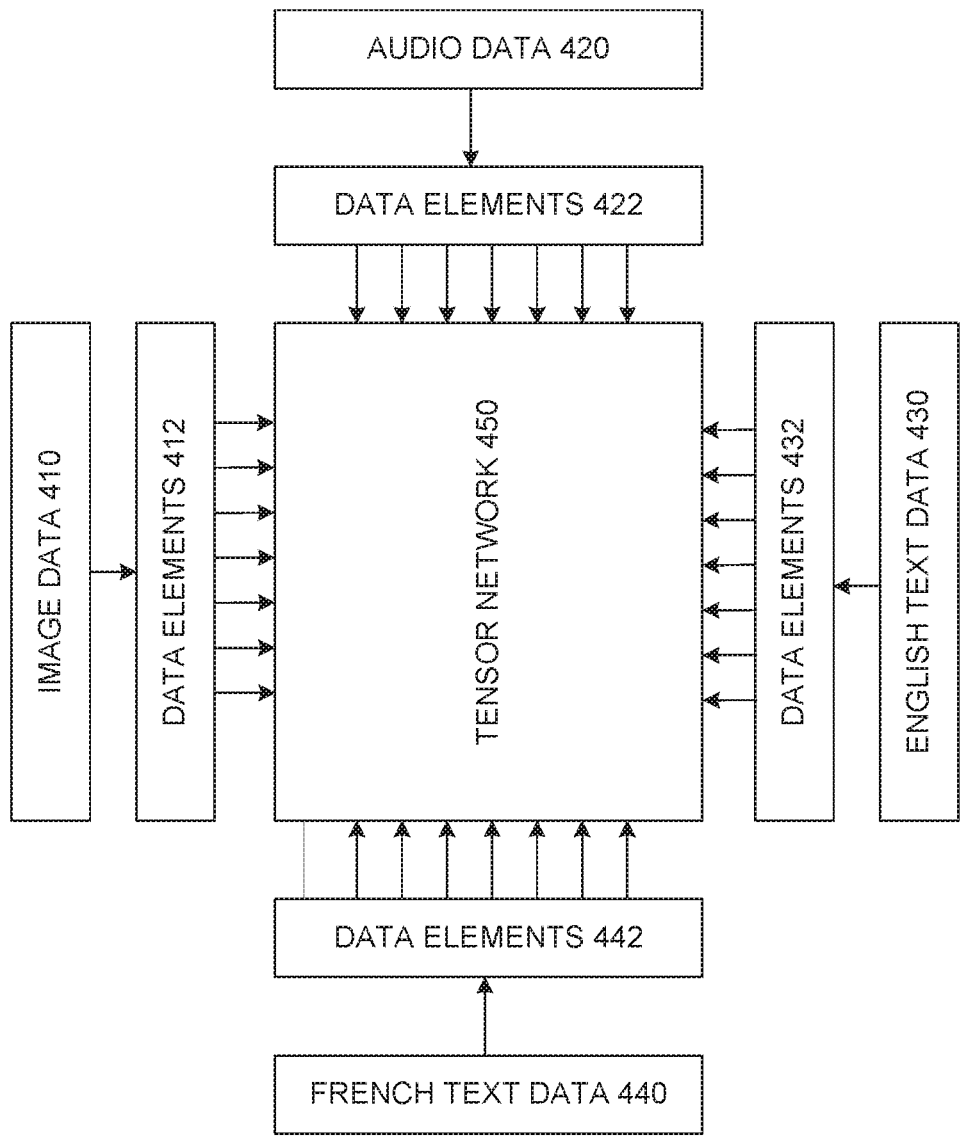
FIG. 4 illustrates aspects a system including a tensor network for analyzing multiple types of input data in accordance with some embodiments.

FIG. 4 illustrates aspects a system including a tensor network for analyzing multiple types of input data in accordance with some embodiments. The system structure of FIG. 4 shows a tensor network 450 can be used to analyze connections between multiple data types. Such a tensor network can have multiple boundary components around a single "bulk" tensor network that that connects different types of input data. This can be used to model multiple kinds of data simultaneously, and to identify relationships or correlations (e.g. meaning vectors) for the data. In the example of FIG. 4, image data 410, audio data 420, English text data 430, and French text data 440 are structured as four types of data elements 412, 422, 432, and 442 (e.g. input data) for a single tensor network. Different processes may be used to translate the data 410,420,430,440 into data elements suitable for input to tensor network 450 (e.g. as inputs to inputs 110, 112, 114, 116, 210, 310, etc.)

In other embodiments, any types and combinations of data may be input into a single tensor network. In various embodiments, such a tensor network may be structured in any fashion, including using multiple different graphs or different graph sizes in any combination. The output produced by the bulk tensor network can be used to move between boundary components. Language translation, image captioning, generation of text from images, speech to text, generation of images from text or speech, or other such operations may be performed using a tensor network. Further, it will be apparent such operations may be applied to other spaces beyond language based operations described above. In some embodiments, for example, certain measurements about quantum systems (e.g. entanglement entropy) allow production of new numbers that can be assigned to data after it's been modeled. For example, a piece of text or an image could have some special numbers attached to it. These numbers are derived from the quantum density, so from a mathematical point of view, these new kinds of measurements are redundant, but they in some embodiments, have independent value, such as a single number that describes the complexity of the text or image.

Further still, while the examples above describe structured graphs selected for a particular application or set of data, some embodiments may operate with dynamic selection of graphs. In such embodiments, training is used to select a graph structure from a set of possible graphs rather than using a fixed tensor network topology. For example, training different tensor network graphs (e.g. topologies) using a set of data with expected output correlations may be used to identify and select tensor network graphs which output both probabilities associated with the expected correlations as well as additional outputs.

As described above, a tensor network may be used to generate output values (e.g. meaning vectors, density values, output tensors, etc.) which describe aspects of the input data elements. Such tensor networks may also essentially "operate in reverse" to accept values at an output (e.g. output 360, 361, 260, 160, etc.) and process these values to generate data at the inputs (e.g. (e.g. as inputs to inputs 110, 112, 114, 116, 210, 310). Combinations of tensor networks may then be used as illustrated in FIG. 5 to perform various operations.

Figure 5:
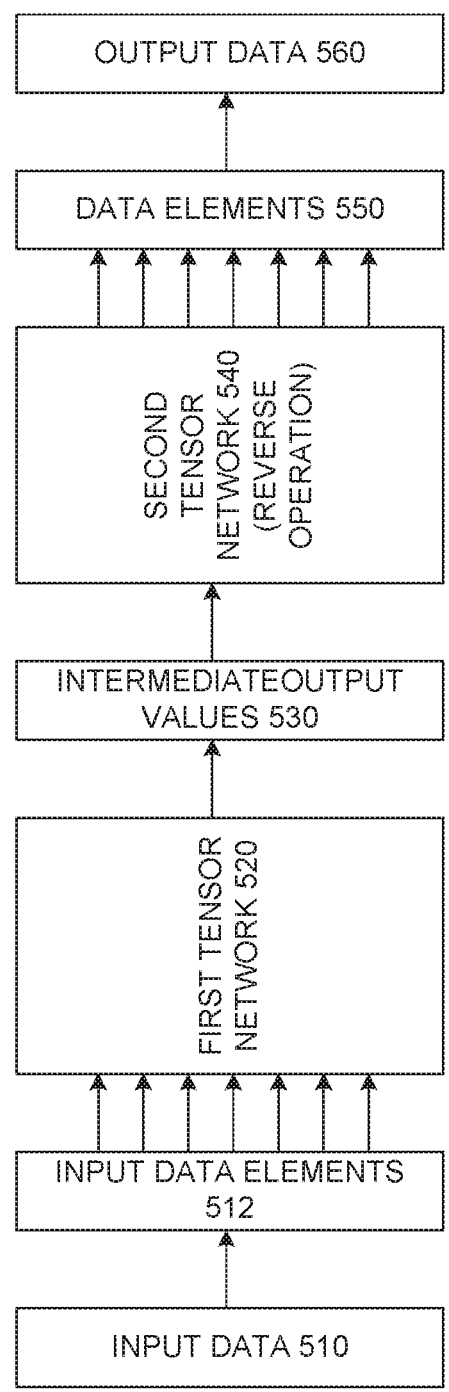
FIG. 5 illustrates aspects of a system including multiple tensor networks for analyzing data in accordance with some embodiments.

FIG. 5 illustrates aspects of a system including multiple tensor networks for analyzing data in accordance with some embodiments. In FIG. 5, input data 510 (e.g. text, audio data, images, or any combination of such meaning data) is processed into input data elements 512. The input data elements are processed by a first tensor network 520 to generate intermediate output values 530. This operation is similar to the operations described above with respect to tensor network 100 of FIG. 1. These intermediate output values 530, however, are then fed into the "output" of second tensor network 540 which is configured for "reverse operations". Second tensor network 540 accepts the intermediate output values 530 (e.g. meaning vectors, probability density values, etc.) and processes them to generate data elements 550 (e.g. vectors similar to the input vectors described above). These output data elements 550 may then be translated into output data 560.

In one embodiment, the system of FIG. 5 may operate as a summarizer by accepting a body of text as the input data, processing the text using the first tensor network 520 configured to process this particular data, and generating meaning vectors associated with the text. Second tensor network 540 may then be a tensor network configured to generate a smaller (e.g. fewer words) set of output data. In certain embodiments, the training and structure of a tensor network may use placeholder values as a means for adjusting or managing the length of different inputs and outputs. For example, "very old" and "x ancient", as described further below. This placeholder structure enables simplified operation with mismatch of data lengths within the structures and operations performed by a tensor network. The meaning vectors generated by first tensor network 520 are provided to second tensor network 540, resulting in output data 560, which is a summary (e.g. shortened) version of the input data.

Similarly, such a system may be used for translation with the first tensor network configured to accept data elements 512 for input data in 510 in a first language, and second tensor network 540 configured to accept meaning vectors and generate data elements 550 for output data 560 in a second language different from the first language.

Such a system may also be used for image captioning or generating summaries of audio data, with the first tensor network 520 configured for audio and/or image (e.g. pictures or video) data and the second tensor network configured to output brief text phrases.

For example, a simple embodiment may process the expressions "very old theatre play" or "very old marble temple" or "very old iron spear" with same size samples including "x ancient theatre play" or "x ancient marble temple" or "x ancient iron spear" which may reduce the phrase size. In a particular example, consider samples "very old theatre play", "x ancient theatre play" "very large grey elephant", "x huge grey elephant" as associated with vector spaces V1:=<a1, a3>, V2:=<a2, a4, a5, a6>, V3:=<b1, b3>, and V4:=<b2, b4> such that a1 corresponds to "very", a2 to "old", a3 to "x", a4 to "ancient", a5 to "large" and a6 to "huge". The pure density corresponding to these samples is:

$$\psi := \frac{1}{2}(a_1 \otimes a_2 \otimes b_1 \otimes b_2 + a_3 \otimes a_4 \otimes b_1 \otimes b_2 + \qquad(64)$$
$$a_1 \otimes a_5 \otimes b_3 \otimes b_4 + a_3 \otimes a_6 \otimes b_3 \otimes b_4).$$

It may then be seen that:

$$Tr_2 Pr_\psi = \qquad(65)$$
$$\frac{1}{4}(a_1^* \otimes a_2^* \otimes a_1 \otimes a_2 + a_1^* \otimes a_2^* \otimes a_3 \otimes a_4 + a_3^* \otimes a_4^* \otimes a_1 \otimes a_2 +$$
$$a_3^* \otimes a_4^* \otimes a_3 \otimes a_4 + a_1^* \otimes a_5^* \otimes a_1 \otimes a_5 +$$
$$a_1^* \otimes a_5^* \otimes a_3 \otimes a_6 + a_3^* \otimes a_6^* \otimes a_1 \otimes a_5 + a_3^* \otimes a_6^* \otimes a_3 \otimes a_6)$$

so that:

$$Tr_2 Pr_\psi = \qquad(66)$$

$$\frac{1}{4}\begin{pmatrix}1&0&0&0&0&1&0&0\\0&0&0&0&0&0&0&0\\0&0&1&0&0&0&0&1\\0&0&0&0&0&0&0&0\\0&0&0&0&0&0&0&0\\1&0&0&0&0&1&0&0\\0&0&0&0&0&0&0&0\\0&0&1&0&0&0&0&1\end{pmatrix} = \begin{pmatrix}1&0&0&0&0&0&-1&0\\0&0&1&0&0&0&0&0\\0&1&0&0&0&0&0&-1\\0&0&0&1&0&0&0&0\\0&0&0&0&1&0&0&0\\1&0&0&0&0&0&1&0\\0&0&0&0&0&1&0&0\\0&1&0&0&0&0&0&1\end{pmatrix}$$

$$\begin{pmatrix}\frac{1}{2}&0&0&0&0&0&0&0\\0&\frac{1}{2}&0&0&0&0&0&0\\0&0&0&0&0&0&0&0\\0&0&0&0&0&0&0&0\\0&0&0&0&0&0&0&0\\0&0&0&0&0&0&0&0\\0&0&0&0&0&0&0&0\\0&0&0&0&0&0&0&0\end{pmatrix} \begin{pmatrix}\frac{1}{2}&0&0&0&\frac{1}{2}&0&0\\0&0&\frac{1}{2}&0&0&0&0&\frac{1}{2}\\0&1&0&0&0&0&0&0\\0&0&0&1&0&0&0&0\\0&0&0&0&1&0&0&0\\0&0&0&0&0&0&1&0\\-\frac{1}{2}&0&0&0&0&\frac{1}{2}&0&0\\0&0&-\frac{1}{2}&0&0&0&0&\frac{1}{2}\end{pmatrix}$$

and:

$$Tr_2 Pr_\psi = PDP^{-1} \qquad(67)$$

where D is the diagonal matrix above in the center, and P and $P^{-1}$ the unitaries on the left and the right of D. with wj, i= j, ..., 8 (e.g. numbering from left to right) the column vectors of P, these are the eigenvectors of $Tr_2 Pr_\psi$. Then, with vi, l=1 ... 8 as the basis vectors of $V_1 \otimes V_2$ given by the sample words, the matrix is written in this basis number from left to right, so that:

$$v_1 = a_1 \otimes a_2, \qquad(68)$$

$$v_2 = a_1 \otimes a_4, \qquad(69)$$

$$v_3 = a_1 \otimes a_5, \qquad(70)$$

$$v_4 = a_1 \otimes a_6, \qquad(71)$$

$$v_5 = a_3 \otimes a_2, \qquad(72)$$

$$v_6 = a_3 \otimes a_4, \qquad(73)$$

$$v_7 = a_3 \otimes a_5, \qquad(74)$$

and $$v_8 = a_3 \otimes a_6. \qquad(75)$$

The meaning vector may is then by definition the projection of $V_1 \otimes V_2$ onto the space spanned by the eigenvectors of $Tr_2 Pr_\psi$ with large eigenvalues. These are $w_1$ and $w_2$ (e.g. the first and second columns of P). The span of $w_1$ and $w_2$ are denoted by W. To compute the projection, $v_i$ is expressed in the basis $w_j$. The relationship between $v_i$ and $w_j$ may be expressed as:

$$v_1 := \frac{1}{2}w_1 - \frac{1}{2}w_7, \qquad(76)$$

$$v_6 := \frac{1}{2}w_1 + \frac{1}{2}w_7, \qquad(77)$$

$$v_3 := \frac{1}{2}w_2 - \frac{1}{2}w_8, \qquad(78)$$

$$v_8 := \frac{1}{2}w_2 + \frac{1}{2}w_8, \qquad(79)$$

which results in a meaning map:

$$f := Pr_W : V_1 \otimes V_2 \to W \qquad(80)$$

which gives $$f(v_1) = f(v_6) = \frac{1}{2}w_1 \qquad(81)$$

and $$f(v_3) = f(v_8) = \frac{1}{2}w_2 \qquad(82)$$

Equations 81 and 82 reflect that "very old" is similar to "x ancient" and "very large" is similar to "x huge", respectively. This further reflects that given meaning vector w1, sampling gives v1 or v6 with equal probabilities. In other words, sampling gives expressions "very old" and "x ancient" with equal probability, so a summarization system may produce "ancient" from "very old", or an associated probability vector input into a tensor network operating in reverse may produce either term, depending on various structures configured in the tensor network. A tensor network configured for reverse operation to produce shorter text may produce "ancient" given the associated meaning vector for both phrases.

Figure 6:
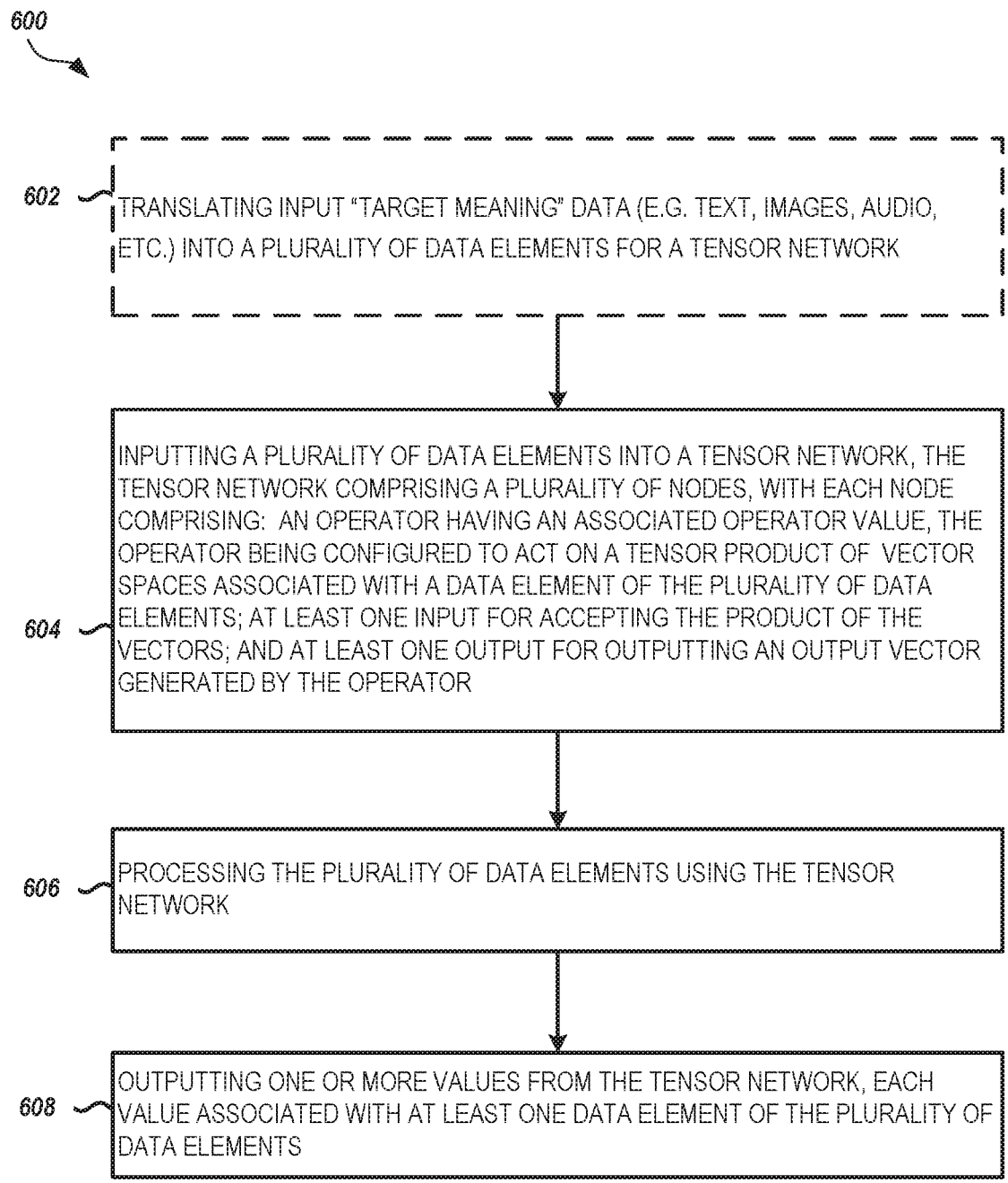
FIG. 6 describes a method for using a tensor network to analyze data in accordance with some embodiments.

FIG. 6 describes a method 600 for using a tensor network to analyze data in accordance with some embodiments. Method 600 essentially describes operations for generating meaning vectors from input data in accordance with some embodiments. In some embodiments, the method 600 is performed by a computing device with one or more processors. In some embodiments, the method 600 is embodied in computer-readable instructions stored in a non-transitory storage device, such that when the instructions are executed by one or more processors of a device, the device performs the method 600. Other embodiments may be implemented using any acceptable format or instantiation.

Method 600 begins with optional operation 602, which involves translating input "target meaning" data into a plurality of data elements. As detailed above, such data may include language data, image data, audio data, or any other such data described above. The data elements may be vectors representing the input data, and is structured in a format to match previous training and structure of the tensor network to analyze the input data elements. Operation 604 then involves inputting a plurality of data elements for input into a tensor network, the tensor network comprising a plurality of nodes, with each node comprising an operator having an associated operator value, the operator being configured to act on a tensor product of vector spaces associated with a data element of the plurality of data elements, at least one input for accepting the product of the vectors, and at least one output for outputting an output vector generated by the operator. The inputting operation may involve accessing data from a memory of the computing device, or receiving the data via a communication interface. In operation 606, the data elements are then processed by the tensor network using processors of the computing device. The tensor network may be implemented as a module or set of structures within the computing device, and processing the data elements using the tensor network may involve the operations described above where tensors of nodes within the tensor network interact with input data elements or information from a previous node in the network to generate an output which is either passed to one or more additional nodes, or presented as an output of the tensor network. This processing is enabled by previous configuration of the tensor network. Such configuration may be based on the type of data being input, the size of the data being input, and training previously performed on a set of dictionary data (e.g. a set of language examples, a set of images with predetermined similarities, a set of audio data with identified meaning, etc.). In operation 608, one or more values output from the tensor network are output, each value associated with at least one data element of the plurality of data elements. This output may be stored in a memory of the computing device, communicated via a communication interface, or output in any other such fashion compatible with the computing device.

Figure 7:
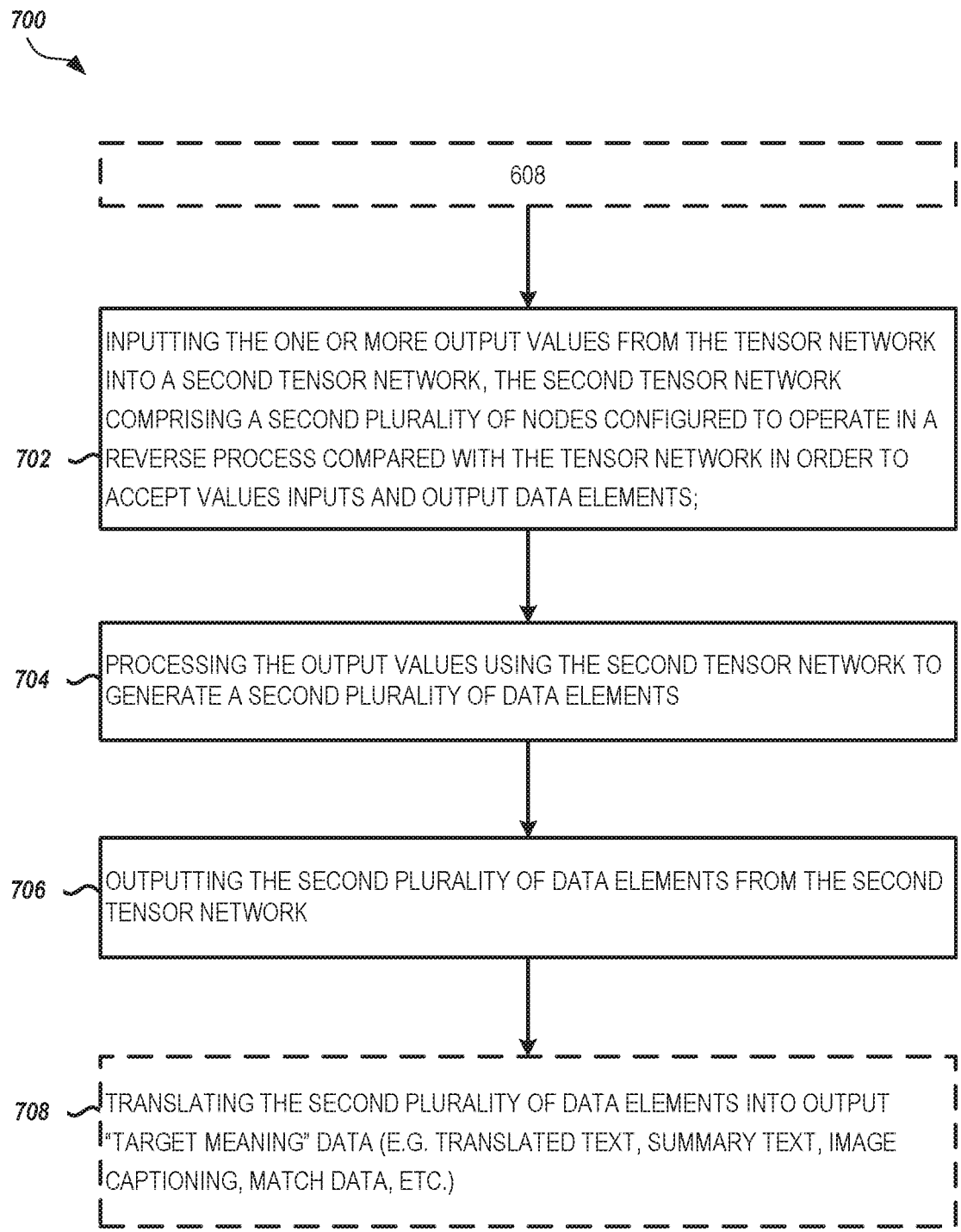
FIG. 7 describes a method for using a tensor network to analyze data in accordance with some embodiments.

FIG. 7 then describes a method 700 for using a tensor network to analyze data in accordance with some embodiments. As described above, certain tensor networks may be configured for "reverse operation", where meaning vectors are input and outputs are used to generate data. Method 700 describes such operations following the operations of method 600. Just as with method 600, in some embodiments the method 700 is performed by a computing device with one or more processors. In some embodiments, the method 700 is embodied in computer-readable instructions stored in a non-transitory storage device, such that when the instructions are executed by one or more processors of a device, the device performs the method 700. Other embodiments may be implemented using any acceptable format or instantiation.

Method 700 accepts the output from operation 608, and in operation 702, inputs the one or more output values from the tensor network into a second tensor network, the second tensor network comprising a second plurality of nodes configured to operate in a reverse process compared with the tensor network in order to accept values inputs and output data elements. Operation 704 then involves processing the output values using the second tensor network to generate a second plurality of data elements, and operation 706 involves outputting the second plurality of data elements from the second tensor network. As a corollary to the operations described above, the second tensor network is also configured for the particular operation of a specific embodiment. For example, the size of the target set of output data elements may be configured, the type of output data may be configured, and the specific structure and configuration of the tensor network may be selected or generated from possible tensor networks based on the particular goal or functionality of the system. This configuration may involve both structuring connections between different nodes of the network, and training the values associated with each node. The actual operations as the data is processed through the second tensor network is performed by one or more processors performing the associated calculations with passing data through a node and then on to other connected nodes. In optional operation 708, the output data elements may further be translated into an output data format (e.g. transformed from output vectors into a corresponding set of data, such as text).

Various example embodiments are now described. It will be apparent that these examples are illustrative only, and are not intended to be a comprehensive list of possible embodiments. Further, while the example embodiments include particular elements or operations, it will further be apparent that additional intervening operations will be compatible with the example embodiments, and that other embodiments may include repeated operations and/or other intervening operations while remaining within the scope of the contemplated innovations.

Example 1 is a computer implemented method comprising: accessing, by one or more processors of a computing device, a plurality of data elements for input into a tensor network, the tensor network comprising a plurality of nodes, with each node comprising: an operator having an associated operator value, the operator being configured to act on a tensor product of vector spaces associated with a data element of the plurality of data elements; at least one input for accepting the product of the vectors; and at least one output for outputting an output vector generated by the operator; processing, by the one or more processors of the computing device, the plurality of data elements using the tensor network; and storing, in a memory coupled to the computing device, one or more values output from the tensor network, each value associated with at least one data element of the plurality of data elements.

In Example 2, the subject matter of Example 1 optionally includes further comprising: training the tensor network by modifying the associated operator value of each operator of each node.

In Example 3, the subject matter of Example 2 optionally includes wherein training the tensor network comprises: selecting a set of fixed training outputs and an associated set of training input data elements; inputting the associated set of training input data elements into the tensor network; adjusting the associated operator value of each operator of each node until the one or more output values from the tensor network match the set of fixed training outputs.

In Example 4, the subject matter of any one or more of Examples 1-3 optionally include wherein the plurality of nodes of the tensor network are connected via a number of inputs and a number of outputs for each node such that the plurality of nodes are configured in a ternary multiscale entanglement renormalization ansatz (MERA) structure.

In Example 5, the subject matter of any one or more of Examples 1-4 optionally include wherein the plurality of nodes of the tensor are connected via a number of inputs and a number of outputs for each node such that the plurality of nodes are configured in a binary multiscale entanglement renormalization ansatz (MERA) structure.

In Example 6, the subject matter of any one or more of Examples 1-5 optionally include wherein the plurality of data elements comprises a sequence of vectors, with each vector comprising a single column of numbers; and wherein each node of the plurality of nodes comprises a multi-dimensional array of numbers with dimensions corresponding to a number of inputs and a number of outputs of a particular node.

In Example 7, the subject matter of Example 6 optionally includes wherein a first portion of the sequence of vectors represents a first data type, and wherein a second portion of the sequence of vectors represents a second data type different than the first data type.

In Example 8, the subject matter of Example 7 optionally includes wherein the first data type and the second data type are selected from an audio data type, a video data type, and a text data type.

In Example 9, the subject matter of any one or more of Examples 6-8 optionally include further comprising: inputting the one or more output values from the tensor network into a second tensor network, the second tensor network comprising a second plurality of nodes configured to operate in a reverse process compared with the tensor network in order to accept values inputs and output data elements; processing the output values using the second tensor network to generate a second plurality of data elements; and outputting the second plurality of data elements from the second tensor network.

In Example 10, the subject matter of Example 9 optionally includes further comprising: processing a body of text in a first language to generate the first plurality of data elements from the body of text in the first language; and processing the second plurality of data elements to generate a second body of text in a second language different from the first language.

In Example 11, the subject matter of any one or more of Examples 9-10 optionally include further comprising: processing a first body of text to generate the sequence of vectors for input to the tensor network as the plurality of data elements; and processing the second plurality of data elements to generate a second body of text, wherein the second tensor network is tuned such that the second plurality of data elements is smaller than the first plurality of data elements so that the second body of text is a summary of the first body of text.

In Example 12, the subject matter of any one or more of Examples 1-11 optionally include wherein: the plurality of data elements are in a tensor product of vector spaces subdivided into a first group and a second group different from the first group such that, for the tensor network $\rho$ comprising a plurality of nodes, an operator $\rho_v$ is defined by tracing out all the nodes corresponding to a subsystem for the first group resulting in $\rho_v = \text{Trace}_W(\rho)$; wherein W is the first group; wherein V is the second group; wherein $\rho$ represents the plurality of nodes for the tensor network; and wherein $\text{Trace}_W(\ )$ is a function for tracing out the nodes corresponding to the subsystem for the first group.

Example 13 is a computer implemented method comprising: inputting a value into a tensor network, the tensor network comprising a plurality of nodes, with each node comprising: an operator having an associated operator value, the operator being configured to act on a product of a vector space associated with a data element of the plurality of data elements; at least one input for accepting the product of the vector space; and at least one output for outputting an output product generated by the product of the vector space and the operator; processing the plurality of data elements using the tensor network; and outputting a plurality of data elements.

In Example 14, the subject matter of Example 13 optionally includes further compromising: training the tensor network by modifying the associated operator value of each operator of each node.

In Example 15, the subject matter of any one or more of Examples 13-14 optionally include wherein the plurality of nodes of the tensor are connected via a number of inputs and a number of outputs for each node such that the plurality of nodes are configured in a ternary multiscale entanglement renormalization ansatz (MERA) structure.

In Example 16, the subject matter of any one or more of Examples 13-15 optionally include wherein the plurality of data elements comprises a sequence of vectors, with each vector comprising a single column of numbers; and wherein each node of the plurality of nodes comprises a multi-dimensional array of numbers with dimensions corresponding to a number of inputs and a number of outputs of a particular node.

Example 17 is a computer readable storage medium comprising instructions that, when executed by one or more processors of a computing device, cause the device to perform operations for processing data using a tensor network, the operations comprising: accessing a set of input data from a memory of the computing device; processing the set of input data to generate a sequence of vectors representing the input data; inputting the sequence of vectors into a tensor network, the tensor network comprising a plurality of nodes, with each node comprising: an operator having an associated operator value, the operator being configured to act on a product of a vector space associated with a data element of the plurality of data elements; at least one input for accepting the product of the vector space; and at least one output for outputting an output product generated by the product of the vector space and the operator; processing the plurality of data elements using the tensor network; and outputting one or more values from the tensor network, each value associated with at least one data element of set of input data.

In Example 18, the subject matter of Example 17 optionally includes wherein the operations further comprise: selecting the tensor network from a plurality of tensor networks based on an input data type and a selected output preference.

In Example 19, the subject matter of any one or more of Examples 17-18 optionally include with the operations further comprising: processing a set of text in a first language to generate the set of input data prior to accessing the set of input data from the memory; inputting the one or more output values from the tensor network into a second tensor network, the second tensor network comprising a second plurality of nodes configured to operate in a reverse process compared with the tensor network in order to accept values inputs and output data elements; processing the output values using the second tensor network to generate a second plurality of data elements; and processing the second plurality of data elements to generate a second set of text in a second language that is different from the first language, such that the second set of text is a translation of the first set of text; and storing the second set of text in a memory of the computing device.

FIG. 8 is a block diagram 800 illustrating architecture of software 802, which can be used to generate and execute operations for generation and use of tensor networks as described above. FIG. 8 is merely a non-limiting example of a software architecture, and it will be appreciated that many other architectures can be implemented to facilitate the functionality described herein. In various embodiments, the software 802 is implemented by hardware such as a machine 900 of FIG. 9 that includes processors 910, memory 930, and I/O components 950. In this example architecture, the software 802 can be conceptualized as a stack of layers where each layer may provide a particular functionality. For example, the software 802 includes layers such as an operating system 804, libraries 806, frameworks 808, and applications 810. Operationally, the applications 810 invoke application programming interface (API) calls 812 through the software stack and receive messages 814 in response to the API calls 812, consistent with some embodiments.

For example, a machine 900 may store both training data, analysis data, and data structures for any number of tensor network models within memory 930. The machine 900 may accept inputs from a user or system operator to initiate operations performed by processors 910 for generation or use of a tensor network, including selection of tensor network topologies based on user inputs or training data, training of a tensor network using training data, and analysis of input data using a trained tensor networks.

In various implementations, the operating system 804 manages hardware resources and provides common services. The operating system 804 includes, for example, a kernel 820, services 822, and drivers 824. The kernel 820 acts as an abstraction layer between the hardware and the other software layers, consistent with some embodiments. For example, the kernel 820 provides memory management, processor management (e.g., scheduling), component management, networking, and security settings, among other functionality. The services 822 can provide other common services for the other software layers. The drivers 824 are responsible for controlling or interfacing with the underlying hardware, according to some embodiments. For instance, the drivers 824 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 806 provide a low-level common infrastructure utilized by the applications 810. The libraries 806 can include system libraries 830 (e.g., C standard library) that can provide functions such as memory allocation functions, string manipulation functions, mathematic functions, and the like. In addition, the libraries 806 can include API libraries 832 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 806 can also include a wide variety of other libraries 834 to provide many other APIs to the applications 810.

The frameworks 808 provide a high-level common infrastructure that can be utilized by the applications 810, according to some embodiments. For example, the frameworks 808 provide various graphic user interface (GUI) functions, high-level resource management, high-level location services, and so forth. The frameworks 808 can provide a broad spectrum of other APIs that can be utilized by the applications 810, some of which may be specific to a particular operating system or platform.

In an example embodiment, the applications include a tensor training and analysis application used to implement various embodiments described herein. In some embodiments, tensor training and analysis application comprises instructions that, when executed by one or more processors 910, cause the machine 900 to perform operations in accordance with any embodiment described herein. Applications 910 may also include any additional number of applications, represented as third party applications 866 which may interact with tensor training and analysis or be separate unrelated applications. In some embodiments, tensor training and analysis application 862 may be implemented on multiple devices, with different application elements communication via a network. This includes structures for implementing nodes of a tensor network, identifying the connections between nodes, and modifying the values for particular nodes as part of training. This also includes processing resources and operations for performing calculations associated with processing data into a form acceptable as input to the tensor network, and performing the calculations associated with processing the input data by the tensor network (e.g. performing calculations at each node and passing the data to one or more next nodes or an output).

According to some embodiments, the applications 810 are programs that execute functions defined in the programs. Various programming languages can be employed to create one or more of the applications 810, structured in a variety of manners, such as object-oriented programming languages (e.g., Objective-C, Java, or C++) or procedural programming languages (e.g., C or assembly language). In a specific example, the third-party application 866 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 866 can invoke the API calls 812 provided by the operating system 804 to facilitate functionality described herein.

FIG. 9 is a block diagram illustrating components of a machine 900, according to some embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein can be executed. In alternative embodiments, the machine 900 operates as a standalone device or can be coupled (e.g., networked) to other machines, with multiple machines connected and in communication to implement one or more tensor networks in accordance with the embodiments described herein. In a networked deployment, the machine 900 may operate in the capacity of a server machine or a client machine in a server-client network environment, or as a peer machine in a peer-to-peer (or distributed) network environment. The machine 900 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

In various embodiments, the machine 900 comprises processors 910, memory 930, and I/O components 950, which can be configured to communicate with each other via a bus 902. In an example embodiment, the processors 910 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) include, for example, a processor 912 and a processor 914 that may execute the instructions 916. The term "processor" is intended to include multi-core processors that may comprise two or more independent processors (also referred to as "cores") that can execute instructions contemporaneously. Although FIG. 9 shows multiple processors 910, the machine 900 may include a single processor with a single core, a single processor with multiple cores (e.g., a multi-core processor), multiple processors with a single core, multiple processors with multiples cores, or any combination thereof.

The memory 930 comprises a main memory 932, a static memory 934, and a storage unit 936 accessible to the processors 910 via the bus 902, according to some embodiments. The storage unit 936 can include a machine-readable medium 938 on which are stored the instructions 916 embodying any one or more of the methodologies or functions described herein. The instructions 916 can also reside, completely or at least partially, within the main memory 932, within the static memory 934, within at least one of the processors 910 (e.g., within the processor's cache memory), or any suitable combination thereof, during execution thereof by the machine 900. Accordingly, in various embodiments, the main memory 932, the static memory 934, and the processors 910 are considered machine-readable media 938.

As used herein, the term "memory" refers to a machine-readable medium 938 able to store data temporarily or permanently and may be taken to include, but not be limited to, random-access memory (RAM), read-only memory (ROM), buffer memory, flash memory, and cache memory. While the machine-readable medium 938 is shown in an example embodiment to be a single medium, the term "machine-readable medium" should be taken to include a single medium or multiple media (e.g., a centralized or distributed database, or associated caches and servers) able to store the instructions 916. The term "machine-readable medium" shall also be taken to include any medium, or combination of multiple media, that is capable of storing instructions (e.g., instructions 916) for execution by a machine (e.g., machine 900), such that the instructions, when executed by one or more processors of the machine 900 (e.g., processors 910), cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 950 include a wide variety of components to receive input, provide output, produce output, transmit information, exchange information, capture measurements, and so on. In various embodiments, "meaning" data analyzed by a tensor network in accordance with embodiments described herein may be data from one or more sensors of a machine 900. This may include image data, from camera 956, motion data from motion sensors 958 position data from position module 962, input (e.g. text or UI data) from input 954, or any other such data from machine 900. Such data may be translated into vector data or other suitable data to be input into an appropriately designed and trained tensor network for analysis. In general, it will be appreciated that the I/O components 950 can include many other components that are not shown in FIG. 9. The I/O components 950 are grouped according to functionality merely for simplifying the following discussion, and the grouping is in no way limiting. In various example embodiments, the I/O components 950 include output components 952 and input components 954. The output components 952 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 954 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like. Data from any such components may be analyzed by a tensor network in accordance with various embodiments described herein.

In some further example embodiments, the I/O components 950 include cameras 956, motion components 958, environmental components 960, or position components 962, among a wide array of other components. For example, the camera(s) 956 include components to capture images and videos. This may also include components to capture depth or distance information that may be integrated with the images and videos. Camera(s) 956 may additionally include hardware, software, and firmware modules for processing image data received at one or more sensors of camera(s) 956 in order to adjust focus, color, brightness, or other aspects of images captured by camera(s) 956. The motion components 958 include acceleration sensor components (e.g., accelerometer), gravitation sensor components, rotation sensor components (e.g., gyroscope), and so forth. The environmental components 960 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 962 include location sensor components (e.g., a Global Positioning System (GPS) receiver component), altitude sensor components (e.g., altimeters or barometers that detect air pressure from which altitude may be derived), orientation sensor components (e.g., magnetometers), and the like. Just as above, data from any such sensors may be captured by a device and analyzed, either alone or in conjunction with other data, by a tensor network in accordance with embodiments described herein.

Communication can be implemented using a wide variety of technologies. The I/O components 950 may include communication components 964 operable to couple the machine 900 to a network 980 or devices 970 via a coupling 982 and a coupling 972, respectively. For example, the communication components 964 include a network interface component or another suitable device to interface with the network 980. In further examples, the communication components 964 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 970 may be another machine or any of a wide variety of peripheral devices (e.g., a peripheral device coupled via a Universal Serial Bus (USB)).

Moreover, in some embodiments, the communication components 964 detect identifiers or include components operable to detect identifiers. For example, the communication components 964 include Radio Frequency Identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 964, such as location via Internet Protocol (IP) geolocation, location via WI-FI® signal triangulation, location via detecting a BLUETOOTH® or NFC beacon signal that may indicate a particular location, and so forth.

In various example embodiments, one or more portions of the network 980 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 916 are transmitted or received over the network 980 using a transmission medium via a network interface device (e.g., a network interface component included in the communication components 964) and utilizing any one of a number of well-known transfer protocols (e.g., Hypertext Transfer Protocol (HTTP)). Similarly, in other example embodiments, the instructions 916 are transmitted or received using a transmission medium via the coupling 972 (e.g., a peer-to-peer coupling) to the devices 970. The term "transmission medium" shall be taken to include any intangible medium that is capable of storing, encoding, or carrying the instructions 916 for execution by the machine 900, and includes digital or analog communications signals or other intangible media to facilitate communication of such software.

Furthermore, the machine-readable medium 938 is non-transitory (in other words, not having any transitory signals) in that it does not embody a propagating signal. However, labeling the machine-readable medium 938 "non-transitory" should not be construed to mean that the medium is incapable of movement; the machine-readable medium 938 should be considered as being transportable from one physical location to another. Additionally, since the machine-readable medium 938 is tangible, the machine-readable medium 938 may be considered to be a machine-readable device.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) is configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules are located in a single geographic location (e.g., within a home environment, an office environment, or a server farm). In other example embodiments, the processors or processor-implemented modules are distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer implemented method comprising:
accessing, by one or more processors of a computing device, a plurality of data elements for input into a tensor network, the tensor network comprising a plurality of nodes, with each node comprising:
a multi-dimensional array of numbers with dimensions corresponding to a number of inputs and a number of outputs of a particular node;
an operator having an associated operator value, the operator being configured to act on a tensor product of vector spaces associated with a data element of the plurality of data elements;
at least one input for accepting the product of the vectors; and
at least one output for outputting an output vector generated by the operator;
processing, by the one or more processors of the computing device, the plurality of data elements using the tensor network;
storing, in a memory coupled to the computing device, one or more output values from the tensor network, each output value associated with at least one data element of the plurality of data elements;
inputting the one or more output values from the tensor network into a second tensor network, the second tensor network comprising a second plurality of nodes configured to operate in a reverse process compared with the tensor network in order to accept values inputs and output data elements;
processing the output values using the second tensor network to generate a second plurality of data elements; and
outputting the second plurality of data elements from the second tensor network.

2. The computer implemented method of claim 1 further comprising:
training the tensor network by modifying the associated operator value of each operator of each node.

3. The computer implemented method of claim 2 wherein training the tensor network comprises:
selecting a set of fixed training outputs and an associated set of training input data elements;
inputting the associated set of training input data elements into the tensor network; and
adjusting the associated operator value of each operator of each node until the one or more output values from the tensor network match the set of fixed training outputs.

4. The computer implemented method of claim 1 wherein the plurality of nodes of the tensor network are connected via a number of inputs and a number of outputs for each node such that the plurality of nodes are configured in a ternary multiscale entanglement renormalization ansatz (MERA) structure.

5. The computer implemented method of claim 1 wherein the plurality of nodes of the tensor are connected via a number of inputs and a number of outputs for each node such that the plurality of nodes are configured in a binary multiscale entanglement renormalization ansatz (MERA) structure.

6. The computer implemented method of claim 1 wherein the plurality of data elements comprises a sequence of vectors, with each vector comprising a single column of numbers; and
wherein each node of the plurality of nodes comprises a multi-dimensional array of numbers with dimensions corresponding to a number of inputs and a number of outputs of a particular node.

7. The computer implemented method of claim 1 wherein a first portion of the sequence of vectors represents a first data type, and wherein a second portion of the sequence of vectors represents a second data type different than the first data type.

8. The computer implemented method of claim 7 wherein the first data type and the second data type are selected from an audio data type, a video data type, and a text data type.

9. The computer implemented method of claim 1 further comprising:
processing a body of text in a first language to generate the first plurality of data elements from the body of text in the first language; and
processing the second plurality of data elements to generate a second body of text in a second language different from the first language.

10. The computer implemented method of claim 1 further comprising:
processing a first body of text to generate the sequence of vectors for input to the tensor network as the plurality of data elements; and
processing the second plurality of data elements to generate a second body of text, wherein the second tensor network is tuned such that the second plurality of data elements is smaller than the first plurality of data elements so that the second body of text is a summary of the first body of text.

11. The computer implemented method of claim 1 wherein:
the plurality of data elements are in a tensor product of vector spaces subdivided into a first group and a second group different from the first group such that, for the tensor network p comprising a plurality of nodes, an operator pv is defined by tracing out all the nodes corresponding to a subsystem for the first group resulting in pv=Trace$_w$(p);
wherein W is the first group;
wherein V is the second group;
wherein p represents the plurality of nodes for the tensor network; and
wherein Trace$_w$O is a function for tracing out the nodes corresponding to the subsystem for the first group.

12. A machine-readable medium comprising instructions that, when executed by one or more processors of a computing device, cause the device to perform operations comprising:
accessing a set of input data from a memory of the computing device;
processing the set of input data to generate a sequence of vectors representing the input data;
inputting the sequence of vectors into a tensor network, the tensor network comprising a plurality of nodes, with each node comprising:
an operator having an associated operator value, the operator being configured to act on a product of a vector space associated with a data element of a plurality of data elements, wherein the plurality of data elements are in a tensor product of vector spaces subdivided into a first group and a second group different from the first group such that, for the tensor network p comprising a plurality of nodes, an operator pv is defined by tracing out all the nodes corresponding to a subsystem for the first group resulting in pv=Trace$_w$(p);

wherein W is the first group;

wherein V is the second group;

wherein p represents the plurality of nodes for the tensor network; and wherein Trace$_w$O is a function for tracing out the nodes corresponding to the subsystem for the first group;

at least one input for accepting the product of the vector space; and at least one output for outputting an output product generated by the product of the vector space and the operator;

processing the plurality of data elements using the tensor network; and outputting one or more values from the tensor network, each value associated with at least one data element of set of input data.

13. The machine-readable medium of claim 12 wherein the operations further comprise:

selecting the tensor network from a plurality of tensor networks based on an input data type and a selected output preference.

14. The machine-readable medium of claim 12 with the operations further comprising:

processing a set of text in a first language to generate the set of input data prior to accessing the set of input data from the memory;

inputting the one or more output values from the tensor network into a second tensor network, the second tensor network comprising a second plurality of nodes configured to operate in a reverse process compared with the tensor network in order to accept values inputs and output data elements;

processing the output values using the second tensor network to generate a second plurality of data elements; and processing the second plurality of data elements to generate a second set of text in a second language that is different from the first language, such that the second set of text is a translation of the first set of text; and storing the second set of text in a memory of the computing device.

* * * * *